US010696916B2

(12) United States Patent
Aswath et al.

(10) Patent No.: US 10,696,916 B2
(45) Date of Patent: Jun. 30, 2020

(54) LUBRICANT COMPOSITIONS COMPRISING CORE-SHELL NANOPARTICLES

(71) Applicant: BOARD OF REGENTS, THE UNIVERSITY OF TEXAS SYSTEM, Austin, TX (US)

(72) Inventors: Pranesh Aswath, Grapevine, TX (US); Richard B. Timmons, Arlington, TX (US); Vinay Sharma, Arlington, TX (US); Ali Erdemir, Naperville, IL (US)

(73) Assignee: Board of Regents, The University of Texas System, Austin, TX (US)

( * ) Notice: Subject to any disclaimer, the term of this patent is extended or adjusted under 35 U.S.C. 154(b) by 194 days.

(21) Appl. No.: 15/593,444

(22) Filed: May 12, 2017

(65) Prior Publication Data

US 2017/0327761 A1 Nov. 16, 2017

Related U.S. Application Data

(60) Provisional application No. 62/336,176, filed on May 13, 2016.

(51) Int. Cl.
*C10M 131/04* (2006.01)
*C10M 145/14* (2006.01)
(Continued)

(52) U.S. Cl.
CPC ............ *C10M 131/04* (2013.01); *B01J 13/14* (2013.01); *B01J 13/22* (2013.01); *C10M 137/10* (2013.01); *C10M 145/14* (2013.01); *C10M 155/02* (2013.01); *C10M 161/00* (2013.01); *C10M 177/00* (2013.01); *C10M 2203/1006* (2013.01); *C10M 2203/1025* (2013.01); *C10M 2205/0285* (2013.01); *C10M 2209/084* (2013.01); *C10M 2213/02* (2013.01); *C10M 2213/062* (2013.01); *C10M 2223/045* (2013.01); *C10M 2229/041* (2013.01); *C10N 2210/02* (2013.01); *C10N 2220/082* (2013.01); *C10N 2230/06* (2013.01); *C10N 2230/42* (2013.01);
(Continued)

(58) Field of Classification Search
CPC ...... C10M 2229/041; C10M 2223/045; C10M 2209/084; C10M 2203/1006; C10M 2213/02; C10N 2220/082; C10N 2230/06; C10N 2240/10
See application file for complete search history.

(56) References Cited

U.S. PATENT DOCUMENTS 8,476,206 B1 * 7/2013 Malshe ................ C10M 141/00
508/498
2007/0193935 A1 * 8/2007 Elsenbaumer ....... B01D 37/025
210/209
(Continued)

*Primary Examiner* — Vishal V Vasisth
(74) *Attorney, Agent, or Firm* — Christopher S. Dodson; Nexsen Pruet, PLLC

(57) ABSTRACT

Lubricant compositions, core-shell nanoparticles, and related methods are disclosed. In an exemplary embodiment, a lubricant composition includes a plurality of core-shell nanoparticles. The nanoparticles include a core, a first shell disposed on the core, and a second shell disposed on the first shell. The first shell is formed from a siliceous material and the second shell is formed from a hydrophobic material. The first and second shells form functional coatings that reduce wear and friction of parts lubricated with the lubricant composition.

19 Claims, 14 Drawing Sheets

(51) Int. Cl.
*C10M 137/10* (2006.01)
*C10M 155/02* (2006.01)
*C10M 177/00* (2006.01)
*C10M 161/00* (2006.01)
*B01J 13/22* (2006.01)
*B01J 13/14* (2006.01)

(52) U.S. Cl.
CPC ...... *C10N 2230/56* (2013.01); *C10N 2240/10* (2013.01); *C10N 2250/12* (2013.01); *C10N 2250/16* (2013.01); *C10N 2260/04* (2013.01)

(56) References Cited

U.S. PATENT DOCUMENTS

| | | | | |
|---|---|---|---|---|
| 2008/0199629 | A1* | 8/2008 | Simor | B05D 1/62 |
| | | | | 427/488 |
| 2012/0039824 | A1* | 2/2012 | Archer | A61K 9/5192 |
| | | | | 424/59 |

* cited by examiner

A) B.O. + ZDDP_350 + 0.33 wt%FNPs

B) B.O. + ZDDP_350

LUBRICANT COMPOSITIONS COMPRISING CORE-SHELL NANOPARTICLES

CROSS REFERENCE TO RELATED APPLICATIONS

This application claims priority to U.S. Provisional Patent Application No. 62/336,176, filed May 13, 2016, the disclosure of which is incorporated by reference herein in its entirety.

STATEMENT REGARDING FEDERALLY SPONSORED RESEARCH

This invention was made with government support under contract number DE-AC02-06CH11357 between the United States Government and UChicago Argonne, LLC representing Argonne National Laboratory. The government has certain rights in the invention.

FIELD

The present disclosure relates generally to the field of lubricants and lubricant additives for the protection of engine parts from wear.

BACKGROUND

Transportation activities employing internal combustion engines continue to represent an increasingly important aspect of everyday life. As a result, there is a constant demand for more efficient engines. This need has become even more important in terms of current worldwide environmental concerns, especially in light of growing emphasis on climate change. To some extent, with technological and engine design advancements, the internal combustion industry has been able to achieve increased performance, better fuel economy, and lower emissions. But, in many cases, these advances have required engines to run under far more severe conditions, such as higher speeds, higher working temperatures, and higher mechanical stresses. In turn, these more extreme conditions have created demands within the lubrication industry to develop new lubricants having improved properties and performance.

Engine oil is vitally important to the protection of engine parts from wear, which directly affects the engine's durability. Most if not all current engine oils contain additives intended to provide a variety of improvements to the performance of the oil. For example, a typical additive package may contain different chemical species each selected to provide a specific task. For example, detergents serve to keep the metal surfaces in the engine free from sludge contaminants. Dispersants keep particle impurities (such as dirt or soot) away from the metal surfaces to prevent them from causing damage to the metal. Anti-acids generally neutralize acids produced in the engine environment that would otherwise cause corrosion in the engine. Viscosity modifiers help the engine maintain an acceptable viscosity across a range of temperatures and conditions.

Important anti-wear additives include zinc dialkyl dithiophosphates (ZDDPs). Despite a very wide range of experimental studies to identify improved anti-wear additives, the lubrication industry has remained dominated by ZDDP. Many scientific studies have been devoted to elucidation of the mechanism by which ZDDP functions as an anti-wear agent. It is currently believed that, at high temperatures and stresses, the ZDDP decomposes, and its subsequent reaction with steel surfaces leads to formation of an amorphous film which consists of zinc and iron poly phosphates, sulfates and sulfides. Extensive characterization of these films, including via x-ray absorption near edge structure spectroscopy (XANES), has revealed that the outer layer of the amorphous films formed by the decomposition of ZDDPs is composed primarily of long chain polyphosphates, whereas inner layers are made up of short chain polyphosphates.

Unfortunately, decomposition of ZDDP in the engine also generates volatile phosphorus species and ash in the engine oils. Furthermore, at the downstream end, the use of ZDDPs damages the catalytic converters in the exhaust system. Accordingly, regulations have been implemented to restrict the amount of ZDDP incorporated into engine oils. Therefore, a need exists for improved lubricants that provide excellent wear protection while alleviating environmental concerns associated with the use of relatively high levels of ZDDP.

SUMMARY

In one aspect, lubricant compositions are described herein which, in some cases, provide one or more advantages compared to other lubricant compositions. Such compositions include additives in the form of core-shell nanoparticle having functionalized coatings or shells for reducing wear and friction. The use of core-shell nanoparticles in lubricant compositions described herein can advantageously decrease the amount of phosphorous-containing additives needed to provide adequate wear protection, which contributes to lower hazardous gas emissions. Moreover, core-shell nanoparticles described herein can work synergistically with phosphorous-containing additives to improve the lubricant's anti-wear and anti-friction performance.

In some embodiments, a nanoparticle described herein comprises a core, a first shell disposed on the core, and a second shell disposed on the first shell. The first shell is formed from a siliceous material. The second shell is formed from a hydrophobic material. Additionally, in some cases, the first shell can conformally coat the core, and the second shell can conformally coat the first shell. As described further herein, each of these shells forms a functionalized surface that improves various aspects of lubricant compositions containing such nanoparticles.

In some instances, a lubricant composition described herein comprises a base oil and a plurality of nanoparticles dispersed in the base oil, the nanoparticles comprising core-shell nanoparticles described herein. Moreover, in some embodiments, a lubricant composition further comprises a phosphorus-containing additive dispersed in the base oil. Notably, the nanoparticles can act in synergy with the phosphorous-containing additive so that a lower amount of the phosphorous-containing additive is required to obtain the same lubricant performance, as compared to an otherwise similar composition that does not include the core-shell nanoparticles.

In another aspect, methods of making nanoparticles are described herein. Such a method, in some cases, comprises providing a plurality of cores, forming a first shell on the cores, and forming a second shell on the first shell. The first shell comprises or is formed from a siliceous material. The second shell comprises or is formed from a hydrophobic material. Further, in some embodiments, the first shell and/or the second shell is formed by plasma polymerization.

These and other embodiments are described in greater detail in the detailed description which follows.

DETAILED DESCRIPTION

Figure 1:
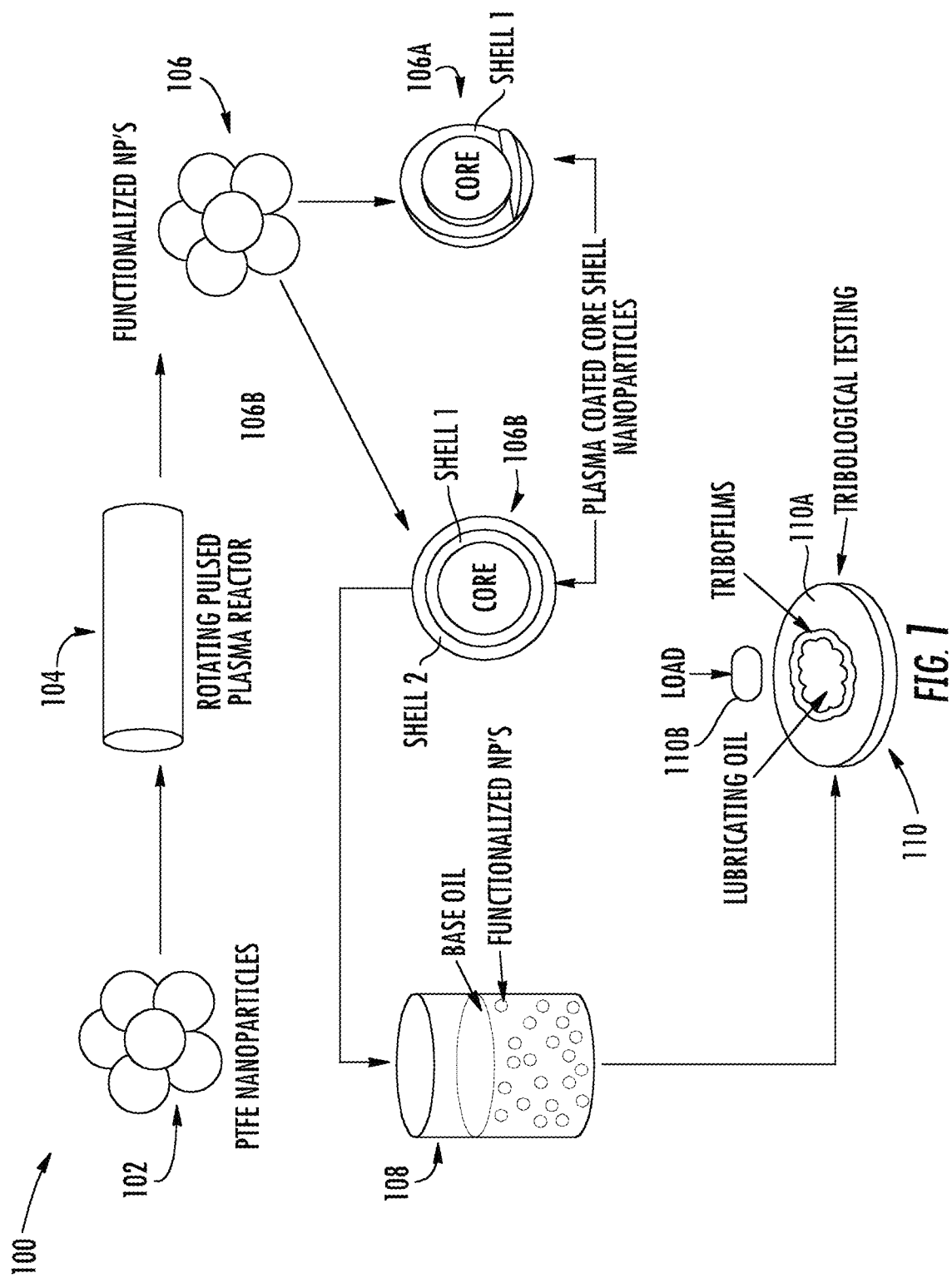
FIG. 1 is a schematic illustration of a method of making core-shell nanoparticles and a lubricant oil or composition, and of a method of lubricating metal parts, according to some embodiments described herein.

Embodiments described herein can be understood more readily by reference to the following detailed description, examples, and figures. The compositions, components, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the subject matter disclosed herein.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Core-Shell Nanoparticles

In one aspect, core-shell nanoparticles for lubricant compositions are described herein. The nanoparticles comprise, consist, and/or consist essentially of a core, a first shell disposed on or over the core, and a second shell disposed on or over the first shell. As described further hereinbelow, the first and second shells form functional coatings or layers over the cores. Additionally, the cores, first shells, and second shells permit the nanoparticles to be well-dispersed in oil and thermally and chemically stable under internal combustion engine operating conditions. Moreover, the core-shell nanoparticles described herein can be used to deliver glass-forming chemical species, such as siliceous materials, to lubricated interfaces for promoting the formation of anti-friction and anti-wear tribofilms at the interfaces.

Turning now to specific components of nanoparticles described herein, nanoparticles described herein comprise nanosized cores. The cores can be formed from any material not inconsistent with the objectives of the present invention. In some embodiments, the cores are formed a material capable of being coated with and/or bound to one or more polymeric layers, including through a plasma polymerization process. Additionally, in some cases, the cores are formed from materials that are thermally stable, chemically stable (i.e., substantially chemically inert and/or chemically resistive), and/or shearable.

Thermally stable materials forming nanoparticle cores described herein, in some embodiments, do not melt or vaporize or exhibit substantial physical or chemical degradation or decomposition at elevated temperatures, such as temperatures of 300-400° C. or 250-400° C. "Substantial" degradation or decomposition, for reference purposes herein, refers to more than 5% degradation or decomposition, by weight, based on the total weight of the original material.

Similarly, chemically stable materials forming nanoparticle cores described herein are substantially unreactive to other species present in a lubricant composition described herein, including at elevated temperatures such as those described above.

Further, a shearable material forming a nanoparticle core described herein, in some cases, has a relatively low shear modulus or modulus of rigidity, such as a shear modulus (G) of no greater than 20 GPa, no greater than 10 GPa, no greater than 5 GPa, or no greater than 2 GPa, at room temperature or at a temperature encountered by a lubricant composition described herein when used in a lubrication application. In some embodiments, a shearable material has a shear modulus (G) of 0-20.0 GPa, 0-10 GPa, 0-5 GPa, 0-2 GPa, 0-1 GPa, 0-0.01 GPa, 0-0.001 GPa, 1-20 GPa, 1-10 GPa, or 1-5 GPa.

In some instances, a nanoparticle core described herein is formed from an organic material, such an organic polymeric material. For example, in some cases, a core described herein is formed from a fluorinated polymer such as a polytetrafluoroethylene (PTFE), perfluoroalkoxy alkane (PFA), fluorinated ethylene propylene (FEP), or polyvinylidene difluoride (PVDF). In certain embodiments, nanoparticle cores described herein comprise, consist essentially of, or consist of PTFE. In other embodiments, nanoparticle cores described herein comprise, consist essentially of, consist of, or are formed from a layered material such as graphite.

Additionally, in some instances, nanoparticle cores described herein, such as PTFE cores, are surface functionalized. In some cases, for example, the cores are carboxylated. Not intending to be bound by theory, it is believed that such functionalization or carboxylation of an exterior surface of polymer cores such as PTFE cores can facilitate binding of the cores to the material forming the first shell. Surfaces of cores described herein may also be functionalized with amine, amide, imide, or phosphate moieties or functionalities. Carboxylated or other functionalized polymer cores described herein can be formed in any manner not inconsistent with the objectives of the present invention, as understood by one of ordinary skill in the art.

Nanoparticle cores can have shape not inconsistent with the objectives of the present disclosure. In some embodiments, the cores have a spherical shape, a faceted or polyhedral shape, a rod shape, or a plate or disc shape. Nanoparticle cores described herein may also comprise a mixture of particle shapes in certain embodiments.

Additionally, nanoparticle cores described herein can have any average size or length in one, two, or three dimensions not inconsistent with the objectives of the present disclosure. In some instances, a core (or population of cores) has a length or size (or average length or size) in one, two, or three dimensions described in Table 1 below.

TABLE 1

Exemplary Core Lengths or Sizes in 1, 2, or 3 Dimensions.

| |
|---|
| ≤500 nm |
| ≤300 nm |
| 200-400 nm |
| 100-300 nm |
| 100-500 nm |
| 50-300 nm |
| 50-500 nm |
| 10-100 nm |
| 10-200 nm |
| 10-300 nm |
| 10-500 nm |
| 1-500 nm |
| 1-300 nm |
| 1-200 nm |
| 1-100 nm |
| 1-50 nm |

Nanoparticles described herein further comprise a first shell disposed on or over the core. In some embodiments, the first shell forms or defines a conformal coating on or over the nanoparticle core. Additionally, the first shell can at least partially encapsulate or fully encapsulate the nanoparticle core. For example, the first shell can surround (e.g., cover or "overcoat") or substantially surround the nanoparticle core. As understood by one of ordinary skill in the art, a first shell that "surrounds" or "substantially surrounds" (or "covers" or "substantially covers" or "overcoats" or "substantially overcoats") the core can surround or substantially surround (or cover or substantially cover or overcoat or substantially overcoat) the exterior surface of the core, such that the first shell surrounds or substantially surrounds (or covers or overcoats) the core in a radial manner. Additionally, the first shell can surround (or cover or overcoat) at least about 80%, at least about 85%, at least about 90%, at least about 95%, at least about 98%, or at least about 99% of the relevant surface or surfaces of the core, based on surface area. Thus, in some cases, the first shell completely or substantially completely surrounds, covers, or overcoats the core.

The first shell can also have any thickness not inconsistent with the objectives of the present in invention. In some instances, for example, the first shell has an average thickness of about 1-100 nm, 1-50 nm, 1-30 nm, 1-20 nm, 1-10 nm, 5-50 nm, 5-30 nm, 5-20 nm, 5-10 nm, 10-50 nm, 10-30 nm, 50-100 nm, 60-100 nm, or 70-100 nm. Other thicknesses are also possible.

In certain embodiments, the first shell is formed from, comprises, consists, and/or consists essentially of a siliceous material. As understood by one of ordinary skill in the art, a siliceous material comprises a network of Si—O or siloxane bonds. The siliceous material forms or defines a coating on or over the cores. As described further herein, the "delivery" of this siliceous material to the surface of a metal part can improve and/or promote the formation of tribological films on the surface of the metal part.

Alternatively, it is also possible, in some cases, for the first shell of a core-shell nanoparticle described herein to be formed from a material other than a siliceous material, particularly when (as described below) the first shell is formed by plasma polymerization. For example, in some cases, the first shell of a core-shell nanoparticle comprises, consists of, consists essentially of, or is formed from a non-metal such as carbon (e.g., as the allotrope graphite), boron, or phosphorus. In other instances, the first shell of a core-shell nanoparticle comprises, consists of, consists essentially of, or is formed from a metal such as zinc.

Moreover, in some instances, the first shell of a core-shell nanoparticle described herein is formed from a plurality of differing materials, including in a layered manner. For example, in some embodiments, the first shell comprises a plurality of layers, the layers differing in chemical composition. Such "layers," it is to be understood, are concentric layers or radial layers of the first shell. A multi-layered first shell can include any number or combination of layers not inconsistent with the objectives of the present disclosure. For example, in some cases, a multi-layer first shell comprises a first layer formed from a siliceous material and a second layer formed from carbon or boron. Other combinations are also possible.

Additionally, in some instances, the siliceous shell or other first shell is formed on or over the cores by a plasma polymerization process. In such a process, as described further hereinbelow in Section II, a silicon-containing monomer (such as a silane, siloxane, disiloxane, or organosilicon compound) can be polymerized in an oxygen-containing gas or plasma phase. Plasma polymerization techniques can result in shell that is covalently bonded or otherwise strongly bonded to the underlying core material. The first shell can bond to the core via covalent, non-covalent, or ionic bonds. Moreover, adherence or bonding of the first shell to the underlying core may be improved in instances where the core is carboxylated, as described above. It is also possible, in some instances, for the first shell to physical encapsulate the core, without necessarily being chemically bonded to the core.

Further, in some embodiments, plasma polymerization also advantageously enables precise control over the composition and/or microstructure of the first shell. For example, the degree of crosslinking, the molecular weight, and/or the thickness or structure of the siliceous material forming the first shell can vary in a radial direction of the nanoparticle. Thus, in some cases, the first shell of a nanoparticle described herein has a gradient structure. Such a structure can be used to vary the temporal "delivery" profile or other "delivery" profile of the siliceous material to a surface of a metal part or a tribological interface under lubrication conditions.

Without being bound by theory, it is believed that the improvement in tribological performance provided by a nanoparticle described herein is due, in part, to delivery of silicon, oxygen, and, optionally, trace amounts of fluorine to the tribological interface or to an existing tribofilm at the interface. Such elemental species can improve and/or promote the formation of improved tribofilms at interfaces between moving metal parts, particularly in the presence of phosphorus-containing lubricant additives such as ZDDP. Tribological films formed in this manner, in some cases, can exhibit a remarkably large decrease in friction coefficients and overall surface wear, as detailed in the Examples sections set forth below. Thus, turning again to the cores of nanoparticles described herein, the nanoparticle cores can act as "delivery agents" configured to "deliver" the siliceous material of the first shell to tribological interfaces.

Nanoparticles described herein further comprise a second shell. In some embodiments, the second shell forms or defines a conformal coating on or over the first shell. Additionally, the second shell can at least partially encapsulate the nanoparticle core and the first shell. In some cases, the second shell fully encapsulates the first shell. In some instances, the second shell can surround (e.g., cover or "overcoat") or substantially surround the nanoparticle core and second shell. In some exemplary embodiments, the second shell can surround (or cover or overcoat) at least about 80%, at least about 85%, at least about 90%, at least about 95%, at least about 98%, or at least about 99% of the relevant surface or surfaces of the first shell, based on the surface area of the first shell. Thus, in some cases, the second shell completely or substantially completely surrounds, covers, or overcoats the first shell.

The second shell may be bonded or adhered to the first shell in any manner not inconsistent with the objectives of the present disclosure. For example, in some cases, the second shell is covalently bonded to the first shell. The second shell can also be ionically bonded to the first shell. It is also possible, in some instances, for the second shell to physical encapsulate the first shell, without necessarily being chemical bonded to the first shell.

Further, the second shell can also have any thickness not inconsistent with the objectives of the present in invention. In some instances, for example, the second shell has an average thickness of about 1-100 nm, 1-50 nm, 1-30 nm, 1-20 nm, 1-10 nm, 5-50 nm, 5-30 nm, 5-20 nm, 5-10 nm, 10-50 nm, 10-30 nm, 50-100 nm, 60-100 nm, or 70-100 nm. Other thicknesses are also possible.

The second shell is formed from, comprises, consists, and/or consists essentially of a hydrophobic material. Not intending to be bound by theory, it is believed that the hydrophobic material imparts a functionalized surface to the nanoparticle for improving and/or assisting with the subsequent dispersion of the nanoparticles in lubricant oils. The second shell can be formed from hydrophobic material not inconsistent with the objectives of the present invention. For example, and in certain embodiments, the second shell is formed from an organic polymer. Exemplary organic polymers comprise, consist and/or consist essentially of a poly (meth)acrylate, a polyketone, a polyaldehyde, a polyvinyl, a polyalkylene, or a mixture thereof. It is to be understood that a "(meth)acrylate" refers generically to both a methacrylate ($R=CH_3$) and an acrylate ($R=H$).

Alternatively, it is also possible, in some cases, for the second shell of a core-shell nanoparticle described herein to be formed from a material other than a hydrophobic material described above, particularly when (as described further herein), the second shell is formed by plasma polymerization. For example, in some cases, the second shell of a core-shell nanoparticle comprises, consists of, consists essentially of, or is formed from a non-metal such as carbon (e.g., as the allotrope graphite), boron, or phosphorus. In other instances, the second shell of a core-shell nanoparticle comprises, consists of, consists essentially of, or is formed from a metal such as zinc.

Additionally, in some instances, the hydrophobic second shell (or other second shell) is formed on or over the first shell by a plasma polymerization process. The second shell may be formed via plasma polymerizing any compound that will form a polymer shell (or other second shell) on or over the first shell. Additionally, when plasma polymerization is used to form the first shell and/or the second shell, the second shell may be polymerized in the same reactor as the first shell, after formation of the first shell, as described further hereinbelow.

Moreover, in some embodiments, the second shell contains one or more hydrophobic pendant groups or other hydrophobic moieties that extend from the exterior surface of the second shell and into the environment (e.g., the liquid lubricant environment) of the core-shell nanoparticles. In other words, the hydrophobic pendant groups or other hydrophobic moieties can radially extend from a surface of the second shell. Again not intending to be bound by theory, it is believed that such groups or moieties can act as "ligands" for the nanoparticles, providing chemical affinity for the lubricant environment and/or providing steric hindrance against agglomeration of core-shell nanoparticles. Thus, the second shell of a nanoparticle described herein can improve the dispersion of the nanoparticles in oil, including in a manner that isolates or substantially isolates the core and/or first shell material of the nanoparticle from contact with the oil environment of the nanoparticle when used in a lubrication application.

In certain embodiments, the hydrophobic pendant groups of a second shell described herein comprise and/or consist essentially of (meth)acrylate moieties extending from a second shell that is formed from a poly(meth)acrylate. More generally, pendant groups or ligands of a second shell described herein can have any molecular weight or size not inconsistent with the objectives of the present invention. In some cases, for example, a pendant group or ligand extending radially from the shell surface has a molecular weight of less than 100 or less than 50. In other instances, the pendant group or ligand has a molecular weight of at least 100, at least 300, at least 500, or at least 1000.

It is to be understood that various components of core-shell nanoparticles described above can be combined in any manner not inconsistent with the objectives of the present invention. For example, any core described above can be combined with any first shell described above and any second shell described above. In some cases, for instance, a core-shell nanoparticle described herein comprises a 100-300 nm spherical core formed from PTFE (such as carboxylated PTFE), a first shell having a thickness of 10-30 nm, and a second shell formed from a poly(meth)acrylate and having a thickness of 1-20 nm. Other combinations are also possible.

II. Methods of Making Core-Shell Nanoparticles

In another aspect, methods of making nanoparticles are described herein. Such methods comprise synthesizing the core-shell nanoparticles described hereinabove in Section I. Such methods include providing a plurality of cores, forming a first shell on the cores, and forming a second shell on the first shell. The materials forming the cores, the first shell, and the second shell are described hereinabove in Section I. Forming the cores, the first shell, and/or the second shell can be carried out in any manner not inconsistent with the objectives of the present disclosure. For example, and in some instances, the first and second shells are deposited over the underlying core via plasma polymerization.

Turning now to formation of the first shell, in some cases, the first shell forms via plasma polymerization of a precursor or monomer in the presence of the nanoparticle core, which may be previously formed. The precursor or monomer may be any precursor of monomer suitable for use in a plasma polymerization process. For instance, the precursor or monomer can have a low vapor pressure and a high volatility. In some embodiments, the precursor or monomer is a siliceous precursor, which, as described above, can be used to form a first shell comprising a siliceous material. The siliceous precursor may be any silicon-containing monomer capable of forming a siliceous material or siloxane-type network when reacted with oxygen in a plasma process. In some cases, the siliceous precursor includes one or more silane(s), siloxane(s), disiloxane(s), silazanes, or organosilicon compounds. In certain embodiments, the first shell is formed via polymerization of hexamethyldisiloxane (HMDSO) in a plasma reactor. As described further below, for example, the HMDSO monomers may be polymerized over PTFE cores in the presence of molecular oxygen in a gas or plasma phase. Moreover, as noted further herein, and in certain instances, the PTFE cores can be irradiated prior to being coated with a shell to impart carboxylic functionality to the cores for improved binding between the cores and first shells.

In other embodiments, the precursor or monomer is a precursor of a non-metal first shell (such as a carbon, boron, or phosphorus shell) or a precursor of a metal shell (such as a zinc shell). In some cases, for example, the precursor or monomer is a metal compound or complex, such as an organometallic compound.

Plasma polymerization can be carried out in any manner not inconsistent with the objectives of the present disclosure. In some cases, the first shell is formed via continuous wave (CW) plasma deposition, pulsed plasma deposition, or a combination of CW and pulsed plasma depositions. Polymerization using a continuous wave plasma may be carried out at radio frequency, such as a frequency of 13.56 MHz. When a pulsed plasma is used, it is possible to vary the ratio of "on time" to "off time" of the plasma pulse, including during the growth or formation of the first shell. As described further herein, by varying the ratio of on to off times, it is possible to form a first shell having a structural gradient, including in a radial direction.

In one exemplary embodiment, nanoparticle cores (e.g., PTFE cores) are introduced into a plasma reactor. A silicon-containing monomer is then provided as a vapor phase and flowed over the cores during plasma polymerization. The monomer is mixed with $O_2$ at a desired ratio. For example, in certain embodiments, a monomer:oxygen mixture having a molar ratio of 1:2 is employed during plasma polymerization. However, it is to be appreciated that ratios of monomers to oxygen may be used not inconsistent with the objectives of the present disclosure.

Further, in some embodiments, an initial layer of the first shell is formed as a result of applying a continuous wave plasma (e.g., at a frequency of 13.56 MHz). The entire first shell may be formed via application of the continuous wave plasma, or the continuous wave plasma may be followed by a one or more pulsed plasma depositions. Where multiple pulses are used to deposit the remaining layers of the first shell, the pulses can have the same or a varied ratio of on to off times. For example, and in some cases, the continuous wave plasma is used to deposit an initial layer of the first shell (film), which strongly adheres to the nanoparticle cores. After this initial deposition, a series of higher or lower ratio of on to off times pulsed plasmas can be used to apply the remaining portions of the first shell. The first shells may or may not be formed with a gradient structure, and each layer of the first shell is tightly bound to other layers of the shell. Where provided, a gradient structure includes variations in the degree of cross-linking and/or molecular weight in a radial direction from the core, as described above. A series of pulsed plasmas can be used to create the gradient structure, where desired.

Where used, the series of pulsed plasma depositions following the continuous wave deposition can comprise a same ratio of on to off times or different, variable ratios of on to off times. Where the ratios of on to off times are varied, each can vary in a manner that is progressively higher (i.e., pulse "on" for a larger portion of the cycle), progressively lower (i.e., pulse "off" for a larger portion of the cycle), or be randomly varied. In an exemplary embodiment, and after the initial continuous wave plasma film deposition, a series of pulsed plasmas having progressively lower ratios of on to off times can be used to form the remaining portions of the first shell. The pulses can be progressively lowered from 50:20 to 50:50 (i.e., four pulses having ratios of on to off times of 50:20; 50:30; 50:40; 50:50) to form a siliceous shell (or other first shell) having a gradient structure. It is appreciated that the structure of the first shell may also be substantially uniform (i.e., not a gradient structure), where desired.

Any number and/or order of continuous and pulsed plasma depositions having any desired ratio of on to off times may be used to form the first shell, or portions thereof, where desired. In some instances, the peak RF power used to deposit the first shell is 10-100 W, 10-60 W, 20-80 W, or 50-70 W. In further embodiments, the peak RF power is kept the same during both the continuous wave and pulsed plasma depositions, when both are employed. For example, the peak RF power may be 120 W, 100 W, 80 W, 60 W, 50 W, or 40 W during the continuous wave and pulsed plasma deposition of the first shell.

Turning again to steps of methods described herein, methods described herein also comprise forming a second shell on the first shell. In some embodiments, the second shell is formed on the first shell by plasma polymerization. In such cases, the second shell can be deposited or formed on the first shell via plasma polymerization in a similar manner as described above for the first shell. Moreover, after formation of the first shell, the second shell can be formed using the same reactor or a different reactor. Additionally, as described above, each of the first and second shells can form conformal coatings over the underlying nanoparticle or shell. Plasma polymerization of the second shell can be carried out in any manner not inconsistent with the objectives of the present disclosure. For instance, in some cases, forming or depositing the second shell comprises exposing the nanoparticles to a second monomer precursor (in particular, a precursor of a second shell material described hereinabove) and applying at least one plasma pulse to the second monomer precursor to form a second conformal coating over the first polymeric shell. The second shell may be formed via application of a continuous wave plasma, a pulsed wave plasma, or combinations thereof.

In an exemplary embodiment, a vapor phase precursor of glycidyl methacrylate is flowed over the nanoparticle cores and first shell, and polymerizes via application of a pulsed plasma. The pulsed plasma can have any ratio of on to off times not inconsistent with the instant disclosure, for example, a ratio of on to off times of 20:50, 20:40, 10:50, 10:40, 50:20, 50:50, or 50:10. The peak RF power used to deposit the second shell may be 120 W, 100 W, 80 W, 60 W, 50 W, or 40 W.

Not intending to be bound by theory, it is believed that plasma polymerization is advantageous in part because it allows precise control over the composition and/or structure of the deposited shells. As those skilled in the art will recognize, the composition of the first and second shells can be readily varied by varying the choice of monomer and/or the plasma discharge operating parameters employed.

It is to be understood that various steps of methods of making core-shell nanoparticles described above can be combined in any manner not inconsistent with the objectives of the present invention.

III. Lubricant Compositions

In another aspect, lubricant compositions are described herein. In some embodiments, such a composition comprises, consists, or consists essentially of a base oil and a plurality of nanoparticles of Section I dispersed in the base oil. In some cases, a lubricant composition described herein further comprises a phosphorus-containing additive dispersed in the base oil. Lubricant compositions described herein, in some instances, may also contain one or more additional and optional performance additives, such as one or more anti-aging additives, anti-corrosion additives, extreme pressure additives, viscosity-modifying additives, detergents and/or additional dispersants.

Turning now to specific components of lubricant compositions, lubricant compositions described herein include a base oil. Any base oil not inconsistent with the objectives of the present invention may be used. In some cases, the base oil comprises, consists, and/or consists essentially of a Group I base stock, a Group II base stock, a Group III base stock, and a Group IV base stock. The American Petroleum Institute (API) has categorized base oils into five categories (see, e.g., API 1509, Appendix E), the first three groups being refined from petroleum crude oil, and Group IV base oils being fully synthetic oils (e.g., polyalphaolefin) oils. Before incorporation of the core-shell nanoparticles, the lubricating oil compositions described herein begin as one or more of these API groups, namely any oil selected from any of Groups I-IV, or combinations thereof. Other base oils may also be used.

The base oil of the lubricant compositions described herein can be present in the composition in any amount not inconsistent with the objectives of the present invention. In some embodiments, for example, the base oil is present in the lubricant composition in an amount of at least about 50, at least about 60, at least about 70, at least about 80, at least about 90, or at least about 95 weight percent, based on the total weight of the lubricant composition. In some cases, the base oil is present in an amount of about 50 to 99 weight percent, about 60 to 99 weight percent, about 70 to 99 weight percent, about 80 to 99 weight percent, about 80 to 95 weight percent, about 80 to 90 weight percent, about 90 to 99 weight percent, or about 90 to 95 weight percent, based on the total weight of the lubricant composition.

Lubricant compositions described herein also include a plurality of nanoparticles dispersed in the base oil. The nanoparticles can comprise any core-shell nanoparticles described hereinabove in Section I. For example, in some cases, the core-shell nanoparticles comprise cores formed from a fluoropolymer such as PTFE, conformal first shells formed from a siliceous material and having a thickness of 10-30 nm, and conformal second shells formed from a poly(meth)acrylate. Other core-shell nanoparticles described hereinabove in Section I may also be used.

Moreover, the plurality of core-shell nanoparticles can define a substantially monodisperse population of core-shell nanoparticles. In some embodiments, the core-shell nanoparticles are monodisperse or substantially monodisperse in the at least one dimension. In some cases, the core-shell nanoparticles are monodisperse or substantially monodisperse in two dimensions or three dimensions. For example, in some cases, a population of core-shell nanoparticles has a size distribution of 15% or less, 10% or less, or 5% or less, where the percentage refers to a percent standard deviation from a mean particle size, such as a D50 particle size. Additionally, in some embodiments, the population of nanoparticles produced according to methods described herein exhibits any of the foregoing monodispersities in an "as-prepared" state, or without being subjected to a post-synthesis size sorting or size selection procedure(s).

The core-shell nanoparticles can be included in a lubricant composition described herein in any amount not inconsistent with the objectives of the present invention. Exemplary amounts of core-shell nanoparticles are provided in Table 2A below, in which the weight percentages are based on the total weight of the lubricant composition.

Lubricant compositions described herein can further comprise a phosphorus-containing additive dispersed in the base oil. Any phosphorous-containing additive not inconsistent with the objectives of the present invention may be used. As described further herein, such additives can impart anti-wear and/or anti-friction capabilities to the lubricant compositions. Moreover, such additives can operate synergistically with core-shell nanoparticles described herein. In certain embodiments, the phosphorus-containing additive comprises zinc dialkyldithiophosphate (ZDDP), zinc di-thiophosphate (ZDTP), an ashless organothiophosphate, a thiophosphate ester, or an organophosphate, or any other phosphorous-containing species not inconsistent with the objectives of the present invention. In some preferred embodiments, the phosphorus-containing additive is ZDDP.

The phosphorus-containing additive can be included in a lubricant composition described herein in any amount not inconsistent with the objectives of the present invention. Exemplary amounts of phosphorus-containing additives are provided in Table 2B below, in which the weight percentages are based on the total weight of the lubricant composition. Notably, in lubricant compositions described herein, phosphorus-containing additives such as ZDDP can be present in smaller amounts than previously thought possible for achieving a desired lubricant performance. Thus, lubricant compositions described herein can advantageously minimize or reduce damage to catalytic converters and/or hazardous gas emissions in certain applications.

TABLE 2A

Wt. % of Nanoparticles in Lubricant Composition.

<5.0 wt. %
<3.0 wt. %
0.1-5.0 wt. %
0.1-3.0 wt. %
0.01-2.0 wt. %
0.01-0.5 wt. %

TABLE 2B

Wt. % of Phosphorous-Containing Additive
in Lubricant Composition.

<3.0 wt. %
<2.0 wt. %
<1.0 wt. %
0.01-0.05 wt. %
0.01-0.04 wt. %
0.001-1.0 wt. %
0.001-0.5 wt. %

Lubricant compositions described herein, in some instances, may also contain one or more additional and optional performance additives, such as one or more anti-aging additives, anti-corrosion additives, extreme pressure additives, viscosity-modifying additives, detergents and/or additional dispersants. Any such materials not inconsistent with the objectives of the present invention may be used, and the amounts and/or identities of these components are not particularly limited.

It is to be understood that various components of lubricant compositions described above can be combined in any manner not inconsistent with the objectives of the present invention. For example, in certain embodiments, a lubricant composition comprises, consists, and/or consists essentially of a base oil (e.g., a Group I, Group II, Group III, or Group IV base oil), a population of core-shell nanoparticles dispersed in the base oil, and a phosphorous-containing additive dispersed in the base oil. The population of core-shell nanoparticles can comprise PTFE cores, a first conformal coating or shell disposed over the core, and a second conformal coating or shell disposed over the first shell, wherein the first shell is formed from a siliceous material and the second shell is formed from a poly(meth)acrylate. In such an embodiment, the nanoparticles can be present in the composition in an amount of about 0.10-3.0 wt. %, based on the total weight of the composition. Further, in an exemplary embodiment described herein, the phosphorus-containing additive is ZDDP, and is provided in the composition in an amount of 0.01-0.04 wt. %, based on the total weight of the composition. Other combinations are also possible.

Further, it will be appreciated that the lubricant compositions described herein can be produced in any manner not inconsistent with the objectives of the present invention. In some embodiments, for instance, a method of making a lubricant compositions described herein comprises first forming core-shell nanoparticles (such as in a manner described hereinabove in Section II) and then dispersing the core-shell nanoparticles and optionally the phosphorus-containing additive in a base oil. Dispersing the core-shell nanoparticles and/or the phosphorous-containing anti-wear additives in the base oil can be carried out using a mixer, shaker, or blender that disperses the particles and additives in the oil until a homogeneous mixture and monodisperse population of nanoparticles is obtained. Other dispersion methods may also be used, as understood by one of ordinary skill in the art.

Lubricant compositions described herein can exhibit a variety of desirable properties and/or provide improved lubrication performance, including for the lubrication of metals or metal parts. For example, in some embodiments, a lubricant composition described herein can reduce the occurrence of wear, friction, and/or fatigue on lubricated metals or metal parts. Further, in some embodiments, a lubricant composition described herein can reduce wear on lubricated metal parts subjected to tribological testing. In some cases, wear of lubricated metal parts may be reduced by about 5% or more, 10% or more, 15% or more, 20% or more, or 50% or more compared to metal parts lubricated with compositions that are devoid of core-shell nanoparticles. In some instances, the wear of lubricated metal parts may be reduced by about 5-75%, 10-75%, 15-75%, 10-50%, or 10-25%. In further instances, wear of lubricated metal parts may be reduced by 5-75%, 10-75%, 10-60%, 15-55%, 15-50%, 20-60%, 20-50%, 30-60%, 30-50%, or 40-60%, wherein the percentage is based on wear scar diameter (WSD).

Additionally, in some cases, a lubricant composition described herein can reduce the torque and/or coefficient of friction (COF) exhibited by metal parts lubricated by the composition. For example, in some cases, the COF may be reduced by 15% or more, 20% or more, 25% or more, 30% or more, or 50% or more compared to metal parts lubricated with a lubricant composition that is devoid of core-shell nanoparticles. In some instances, the COF is reduced by 5-75%, 5-50%, 10-50%, 10-25%, 10-20%, 15-40%, or 15-25%.

IV. Methods of Lubricating Metal Parts

In yet another aspect, methods of lubricating metal parts are provided herein. Such methods comprise, consist, and/or consist essentially of applying a lubricant composition described hereinabove in Section III to a first metal part and positioning the first metal part opposite a second metal part. The parts can contact or engage, and an anti-friction and/or anti-wear tribofilm forms at the interface there between. Moreover, in some instances, methods of lubricating parts described herein comprise placing the metal parts in frictional contact with each other and forming anti-wear and/or anti-friction tribofilms in situ at one or more contacting surfaces and/or interfaces between contacting surfaces of the metal part. In some cases, the anti-wear and anti-friction tribofilms form as a result of the synergistic combination between the siliceous nanoparticle shell and the phosphorous-containing additive.

It is to be understood that the contacting surfaces/interfaces between the lubricated metal parts can be external surfaces that are subjected to metal-on-metal moving contact. It is further to be understood that a lubricant composition described herein can be disposed between the contacting surfaces to provide lubrication to the surfaces. Therefore, in some embodiments, a lubricant composition described herein can be used to lubricate metal parts, such as axles, rods, bearings, pistons, piston rings, gears, valves, shafts, and/or cams, by applying the lubricant composition to the contacting surfaces thereof prior to movement of the parts, thereby reducing or preventing wear and/or friction of the moving parts.

Some embodiments described herein are further illustrated by the following non-limiting examples.

EXAMPLE 1

Synthesis of Plasma Functionalized Nanoparticles

The materials used in the preparation of plasma functionalized nanoparticles (which may also be referred to herein as "FNPs") in this exemplary embodiment were analytical reagent grades. Polyfluortetraethylene (PTFE, $(CF_2CF_2)_n$) nanoparticles (MP1150), having an average size of 200 nm, were procured from the Dupont® Corporation. Hexamethyldisiloxane (HMDSO, $(CH_3)_3SiOSi(CH_3)_3$) and glycidyl methacrylate ($C_7H_{10}O_3$) were used as purchased from Sigma-Aldrich. Zinc dialkyldithiophosphate (ZDDP) was supplied by Oronite. Table 3 below identifies the chemical structures of the materials used to form FNPs according to this exemplary embodiment.

TABLE 3

Chemical Structures.

| Material Name | Chemical Structure |
| --- | --- |
| Polyfluortetraethylene (PTFE) | $\left(\begin{array}{cc} F & F \\ | & | \\ -C-C- \\ | & | \\ F & F \end{array}\right)_n$ |
| Hexamethyldisiloxane (HMDSO) | $H_3C-\underset{\underset{CH_3}{|}}{\overset{\overset{CH_3}{|}}{Si}}-O-\underset{\underset{CH_3}{|}}{\overset{\overset{CH_3}{|}}{Si}}-CH_3$ |
| Glycidyl methacrylate | (epoxide-CH2-O-C(=O)-C(CH3)=CH2) |
| Zinc dialkyldithiophosphate (ZDDP) | $RO\underset{R'O}{\overset{}{\diagdown}}\underset{S}{\overset{S}{P}}\underset{}{\overset{}{\diagdown}}Zn\underset{}{\overset{}{\diagdown}}\underset{S}{\overset{S}{P}}\underset{OR'}{\overset{OR}{\diagdown}}$ |

FIG. 1 is a schematic illustration of the process flow, generally designated 100, used to provide various types of FNPs and lubricant oil compositions incorporating FNPs, namely, functionalized PTFE nanoparticles. At 102, a plurality of cores are provided and introduced into a rotating pulsed plasma reactor at 104. Specifically, a 360° rotatable plasma reactor was employed to modify the surfaces of the nanoparticles. The rotary reactor helped alleviate particle aggregation of the nanoparticles and achieved a more uniform surface modification during plasma processing.

During treatment at 104, the nanoparticles of PTFE are coated with multiple films (shells) in the chamber of the plasma reactor. The first film or shell is a siliceous material containing siliceous functional groups formed from a mixture of oxygen and the monomer HMDSO as the siliceous precursor. The siliceous shell assists in the formation of improved tribofilms that are stronger and exhibit less wear than using a phosphorus-containing additive alone. A ratio of HMDSO to oxygen in the gas mixture was 1:2, and deposition was carried out at an RF frequency of 13.56 MHz. Mixing oxygen gas with the siliceous monomer provided a silica rich film by knocking out the carbon in the form of carbon dioxide. During plasma deposition, a first shell forms at 106A during plasma polymerization of the HMDSO, and a second shell forms at 106B during plasma polymerization of glycidal methacrylate. The second shell polymerized from glycidal methacrylate prevents agglomeration of the functionalized particles when suspended and/or dispersed in a base oil. Plasma polymerization facilitates precise control over the composition of the deposited shells.

At 108, the plasma functionalized PTFE nanoparticles are dispersed in a base oil. Various different oil formulations were formed and subjected to extensive friction and wear experiments in boundary lubrication regime to investigate the performance of these functionalized nanoparticles in the oil. As described hereinbelow, the oils also contained reduced amounts of phosphorous-containing additives, such as ZDDP, for determining the interaction between the functionalized nanoparticles and ZDDP additives.

At 110, friction coefficients, wear volumes, and tribological testing are carried out. During such tests, lubricating oil was provided between a first part 110A and a second part 110B. The second part 110B rotated, rolled, or otherwise was in frictional contact with and/or frictionally engaged with the first part 110A, imparting a frictional load or force thereto. One or more tribological films (i.e., tribofilms) formed at the interface between the opposing parts and protected the parts from excessive wear during the frictional contact. In addition to the measurements of friction coefficients and wear volumes, the surfaces of the parts were subjected to a wide range of chemical analyses including X-ray photoelectron spectroscopy (XPS) and X-ray absorption near edge spectroscopy (XANES) spectroscopy in order to determine the compositions of the thin boundary films that formed during tribological testing of metal parts 110A, 110B. The tribological thin films resultant from application of the lubricating oil provided a remarkably large decrease in both friction coefficients and overall surface wear as detailed herein, in part, because of the synergistic interaction between the ZDDP and shells of the functionalized PTFE nanoparticles.

Figure 2A:
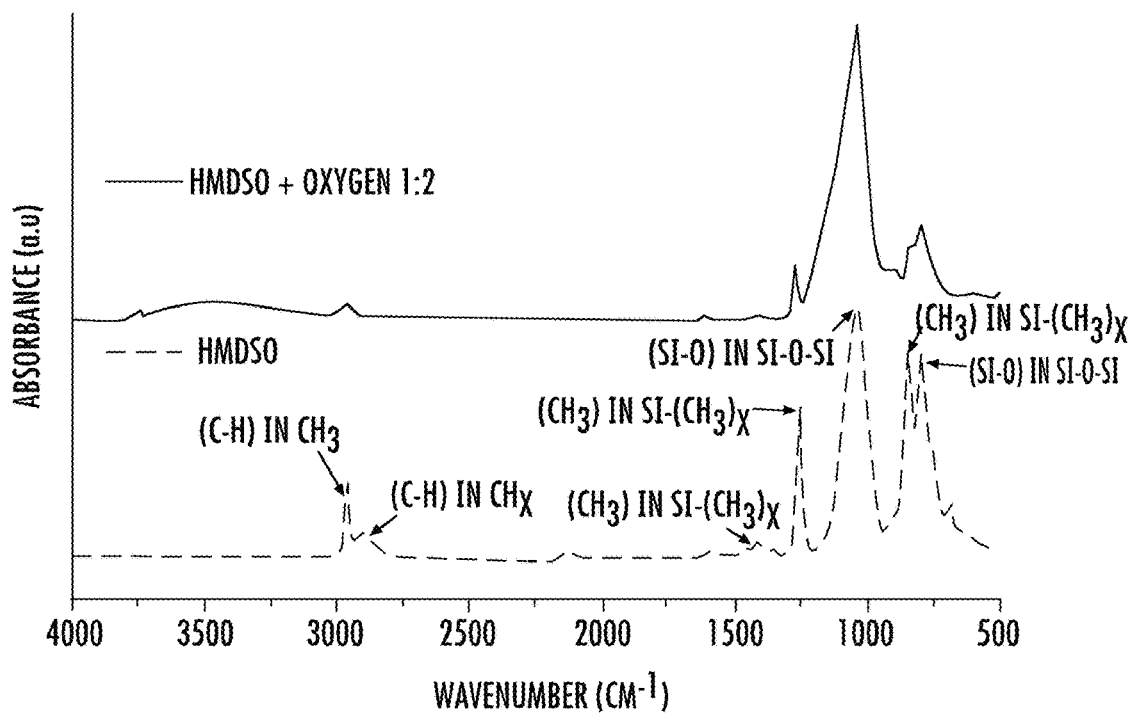
FIG. 2A depicts Fourier Transform Infrared Spectroscopy (FTIR) spectra of a film deposited on a silicon wafer for evaluating steps of a method of making core-shell nanoparticles according to some embodiments described herein.

FIG. 2A depicts the change in Fourier transform infrared spectroscopy (FTIR) spectra for plasma-processed films formed during plasma polymerization of HMDSO in the absence and/or presence of oxygen gas as described in Example 1 above. For example, the upper FTIR spectra in FIG. 2A is for HMDSO+$O_2$ (i.e., at a 1:2 ratio) and the lower FTIR spectra is for HMDSO without $O_2$. Each spectra was obtained for films deposited at a pressure of 300 mT, a flow rate of 2 sccm, a power of 60 W, and a deposition time 15 minutes. However, it should be noted that the data shown in FIG. 2A was obtained from films formed on a silicon wafer rather than on nanoparticle cores described here. Similar results are obtained on nanoparticle cores described herein.

The initial deposition was performed via continuous wave plasma followed with progressively lower ratio of on to off times pulsed plasmas. Plasma polymerization may be provided via continuous wave (CW), radio frequency (13.56 MHz) power, pulsed power, or combinations thereof. Pulsed plasmas provide access to lower CW equivalent powers because the RF power is only on for a portion of the cycle time. The CW deposits a film strongly adhered to the substrate and the lower ratios of on to off times provide a gradient layer structure with each layer tightly bound to the other. The flow rate was kept at 2 sccm and pressure was kept at 300 mT throughout the process. Total deposition time was 75 min with CW and progressively lower ratios of on to off times (50:20 to 50:50) each for 15 min. The peak RF power was kept at 60 W for both CW and pulsed plasma. The ratio of on to off times is the ratio of RF on time:off time.

Subsequently, after plasma polymerization of the HMDSO monomer over the PTFE core, thin polymer films containing methacrylate ligands were deposited on top of the siliceous coated nanoparticles to assist the subsequent dispersion of the particles in the oils. The latter deposition was done for 1 hour at 100 mT pressure, 100 W RF power and the ratio of on to off times was kept 20:50. The PTFE nanoparticles, functionalized with both HMDSO and methacrylate plasma coatings are referred to as functionalized nanoparticles and/or FNPs herein.

Figure 2B:
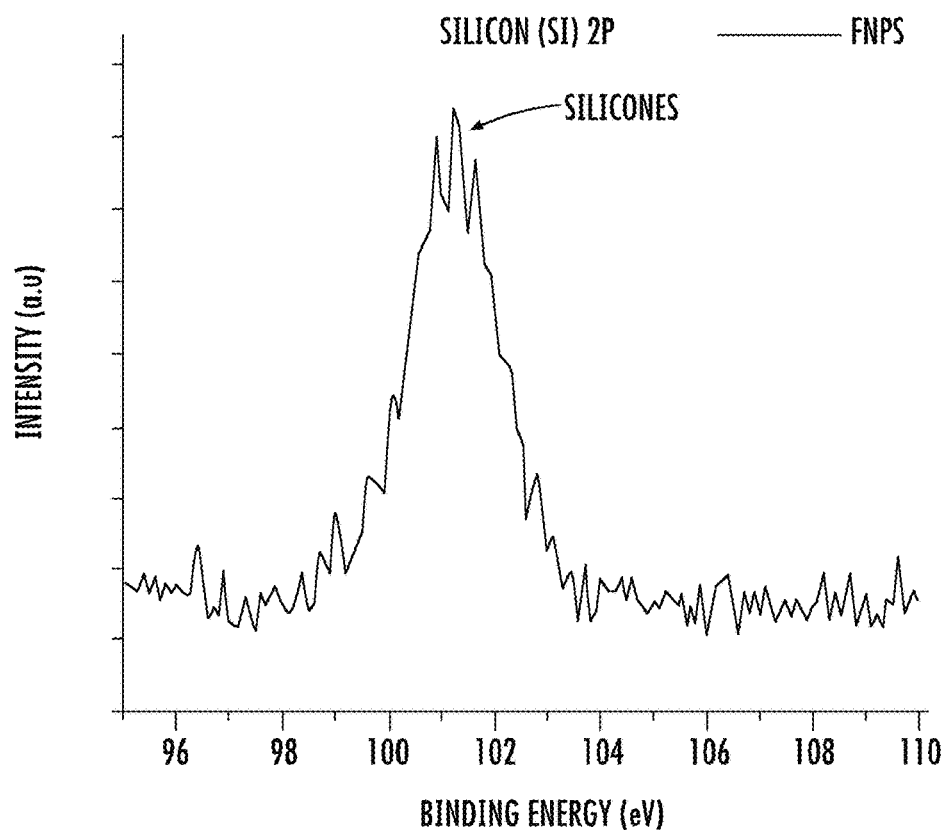
FIG. 2B depicts x-ray Photoelectron Spectroscopy (XPS) spectra for core-shell nanoparticles according to one embodiment described herein.

The PTFE nanoparticles harvested from the reactor after plasma functionalization with HMDSO monomer were characterized using XPS. FIG. 2B illustrates the Silicon 2p XPS spectra for FNPs. The peaks around the 101 eV binding energy represent the presence of siliceous plasma coating on the surface of PTFE nanoparticles.

EXAMPLE 2

Tribological Evaluation of Lubricant Compositions

Various lubricant compositions were tested at 1 and 4 hours. The test configuration included a high-frequency reciprocating cylinder (e.g., 110B, FIG. 1) on a flat surface (e.g., 110A, FIG. 1), which closely simulates the tribological interaction of a piston ring on a liner in the actual automobile engines.

Testing Conditions for 1 Hour Tests:

Group III base stock (i.e., GS kixx Lubo 4 cSt) was used as the carrier (base) oil for all the tests performed in this Example. The phosphorus level for ZDDP was kept at 350 ppm and four different oil formulations were prepared. The details regarding each test formulation are shown below in Table 4.

TABLE 4

Oil Formulations for 1 Hour Tests

| ID | Formulation |
|---|---|
| A. | Group III Base oil (B.O.) |
| B. | B.O. + ZDDP with 350 ppm of Phosphorus treat rate |
| C. | B.O. + ZDDP with 350 ppm of Phosphorus treat rate + 0.33 wt. % (non-functionalized) PTFE |
| D. | B.O. + ZDDP with 350 ppm of Phosphorus treat rate + 0.33 wt. % FNPs |

To achieve a homogenous mixture having a uniform dispersion of functionalized nano-additives in base oil, each blend was subjected to probe sonication for about 30 minutes just before the test. Two to three drops of each formulation mix were used for testing, and applied between the reciprocating cylinder and flat surface. The results for tribological tests in this Example were performed using a Bruker UMT machine under 82 N load, which results in an initial Hertzian contact pressure of 500 MPa. Tests were run at 5 Hz reciprocation speed for 60 minutes for each formulation at 100° C. The stroke length was 6 mm and both the cylinder and flat surface were formed from 52100 hardened steel. Data acquisition was performed using Bruker's UMT software. All test specimens were thoroughly cleaned prior to the tests using Stoddard solvent, isopropanol, and acetone to remove any residue of oil and/or other contaminants from the surfaces. The samples were cleaned with heptane after the tests and the rubbed surfaces were then preserved by submerging in poly-α-olefin (PAO) oil.

Testing Conditions for 4 Hours Tests:

Three different oil formulations were prepared using the same approach mentioned above in regards to the 1 hour formulations. The phosphorous level was kept at 700 ppm in one formulation, 350 ppm in another formulation, and details regarding each formulation are shown in Table 5. Other than the duration of the test (i.e., 4 hours), the rest of the parameters and conditions were kept the same as described above for the 1 hour tests. Repeats were carried out for all the tests (1 hour and 4 hours) to verify the reproducibility of the experiments. In order to do an assessment of wear volume losses, the cylinders after the tests were first cleaned with heptane and then examined under an optical microscope and 3D optical interferometer.

TABLE 5

Oil Formulations for 4 Hour Tests.

| ID | Formulation |
|---|---|
| E. | Group III Base oil (B.O.) |
| F. | B.O. + ZDDP with 700 ppm of Phosphorus treat rate |
| G. | B.O. + ZDDP with 350 ppm of Phosphorus treat rate + 0.33 wt. % FNPs |

To understand the tribochemistry of the boundary films formed at the sliding interfaces between the cylinder and plate, surface sensitive techniques such as X-ray Photoelectron Spectroscopy (XPS) and X-ray Absorption Near Edge Structure (XANES) were employed. XPS analysis was performed with the Kratos Axis Ultra system using monochromatic an Al $K_\alpha$ X-ray source. This spectroscopic technique reveals the presence of an element, its abundance on the sample surface (e.g., typical detection depth ~5 nm) and the chemical bonding state. For analysis, the flat steel specimens were first cleaned with hexane to remove the oil from the surface and then loaded on the sample holder. Before data collection, each specimen was sputter cleaned using an ion gun (beam energy 4.20 keV) for about 10 minutes and then the x-ray gun was slowly ramped up to 150 W power before data accumulation. The spot size of the x-ray beam for data collection was kept at 300 μm×700 μm.

XANES work was performed at the Canadian Light Source synchrotron facility at Saskatoon, Canada. This study was helpful in looking at phosphorus species in the tribofilms of the samples at different depths of penetration. Phosphorus K-edge spectra were collected at Soft X-ray Microcharacterization Beamline (SXRMB) beam station, which provides an energy range from 1.7 keV to 10 keV, a photon resolution of $3.3 \times 10^{-4}$ InSb (111), and operated using 1 mm×2 mm spot size. The phosphorus L-edge data was collected at Variable Line Spacing Plane Grating Monochromator (VLSPGM) beam station. This beam line has a photon resolution of greater than 10,000 E/ΔE and the energy range from 5.5 eV to 250 eV. In this Example, the spot size of the photon beam was kept at 100 μm×100 μm.

Figure 3A:
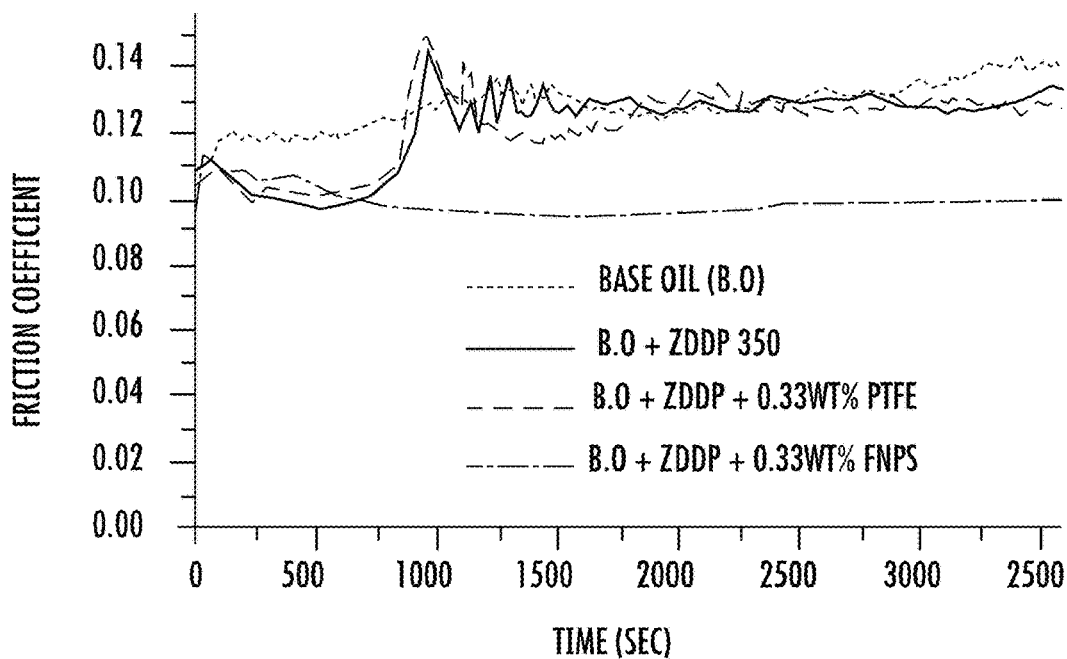
FIGS. 3A and 3B each graphically illustrate results of tribological testing for lubricant compositions according to some embodiments described herein.

For the 1 hour tests, the base oil (A), the base oil with only ZDDP (B), and the base oil with ZDDP and non-functionalized PTFE particles (C) samples exhibited essentially the same friction profile. However, in sharp contrast with these three samples, the coefficient of friction obtained for the oil formulation with ZDDP and functionalized PTFE nanoparticles (D) exhibited dramatically lowered and stable coefficient of friction values as shown in FIG. 3A. The ZDDP and non-functionalized PTFE nanoparticles when used together in the oil did not yield any synergistic effects (i.e., formulation C, Table 4). However, when functionalized PTFE (FNPs) was mixed in with ZDDP, a lower coefficient of friction is observed due to synergism between the additives (i.e., formulation D, Table 4).

Figure 3B:
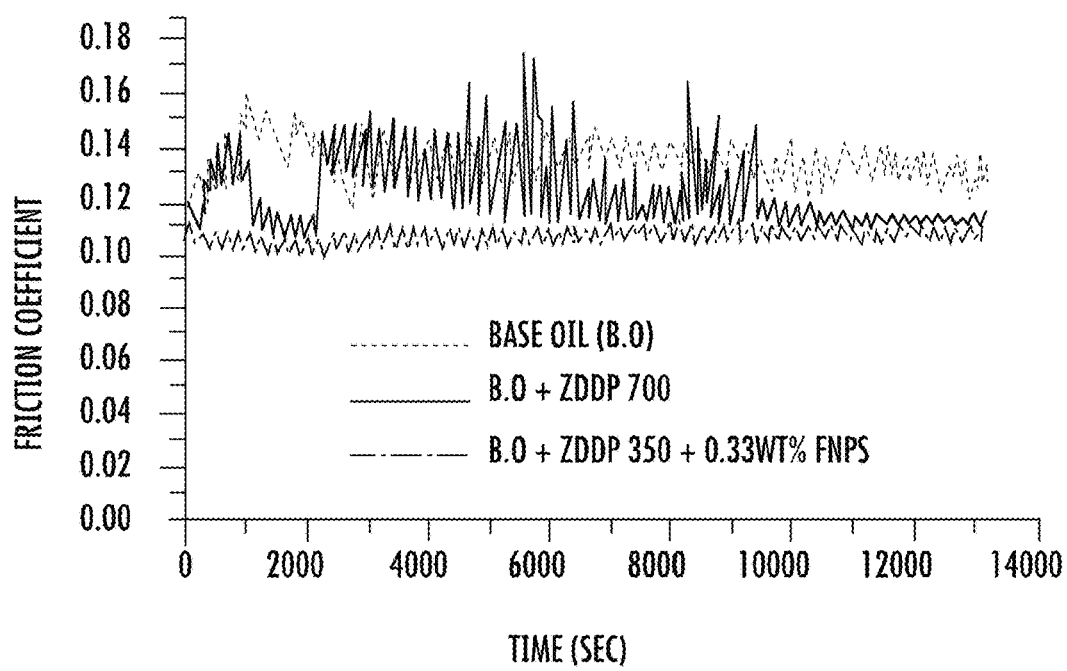

Further, for the 4 hours tests, the oil with ZDDP (350 ppm P level) and FNPs (i.e., formulation G, Table 5) exhibited the most stable friction behavior. It has lower values for coefficient of friction even compared to the oil formulation having a higher amount of ZDDP (i.e., formulation F having a 700 ppm phosphorous level, see Table 5) as shown in FIG. 3B.

Figure 4A:
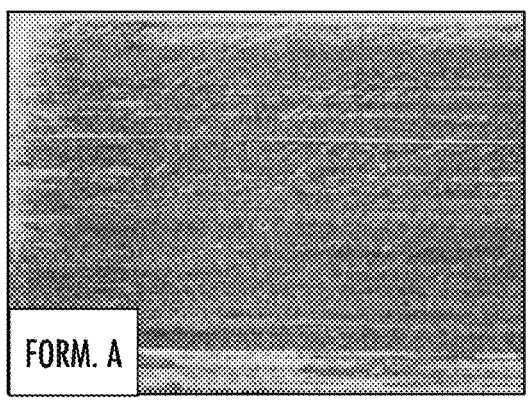
FIGS. 4A-F illustrate optical microscopy images of wear scars on metal parts lubricated with a lubricant composition according to some embodiments described herein.
Figure 4B:
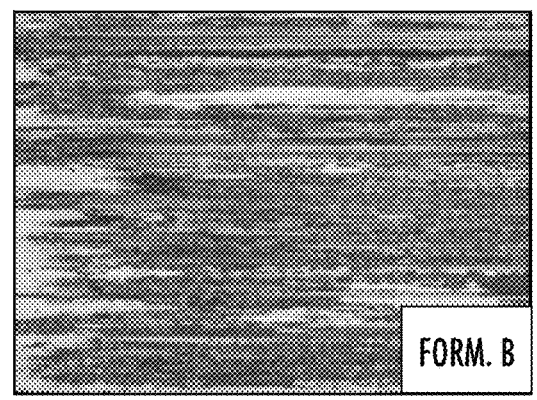
Figure 4C:
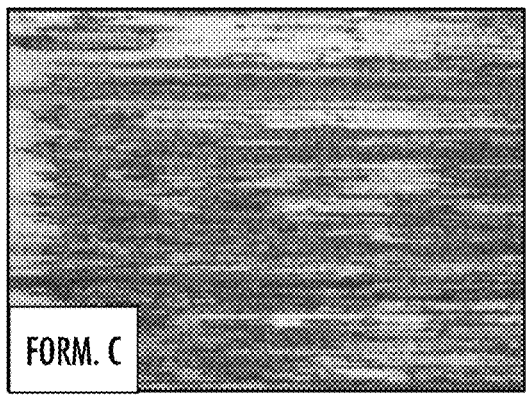
Figure 4D:
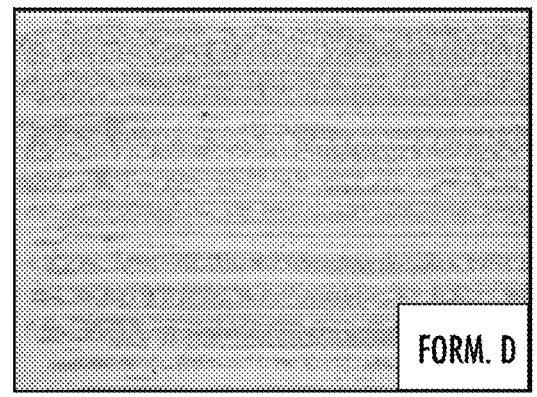
Figure 4E:
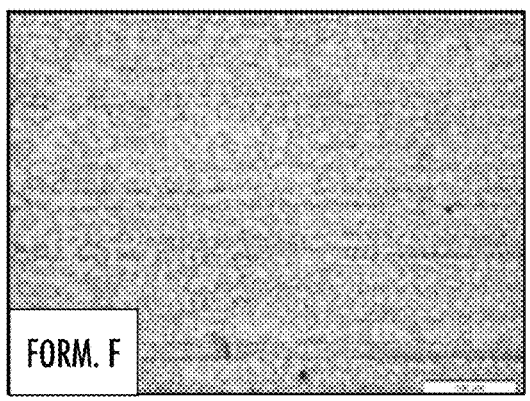
Figure 4F:
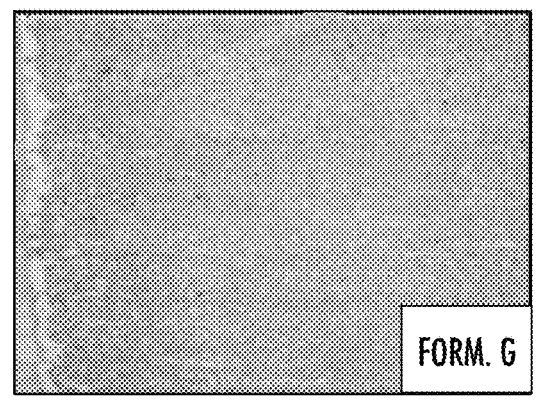

After the tribological testing, the cylinder profiles were examined and revealed that the formulations using ZDDP and FNPs exhibited better wear characteristics during both the 1 and 4 hours tests. In addition, the wear surface on the flat specimen have visually distinguishable features that reveal oil with ZDDP and FNPs offered excellent wear protection as shown in the optical micrographs of FIGS. 4A-F. For example, FIG. 4A is an optical micrograph of the wear surface of the flat steel specimen from formulation A (i.e., "FORM. A"), tested at 1 hour, FIG. 4B is an optical micrograph of the wear surface of the flat steel specimen from formulation B (i.e., "FORM. B"), tested at 1 hour, FIG. 4C is an optical micrograph of the wear surface of the flat steel specimens from formulation C (i.e., "FORM. C"), tested at 1 hour, and FIG. 4D is an optical micrograph of the wear surface of the flat steel specimens from formulation D (i.e., "FORM. D"), tested at 1 hour. FIGS. 4E-F are optical micrographs of the flat steel specimen surfaces after the 4 hour tests. For example, FIG. 4E is an optical micrograph of the wear surface of the flat steel specimen from formulation F (i.e., "FORM. F"), tested at 4 hours and FIG. 4F is an optical micrograph of the wear surface of the flat steel specimens from formulation G (i.e., "FORM. G"), tested at 4 hours. Specimens treated with formulations D and G (i.e., FIG. 4D and FIG. 4F) are visibly less worn than the remaining specimens.

Figure 5A:
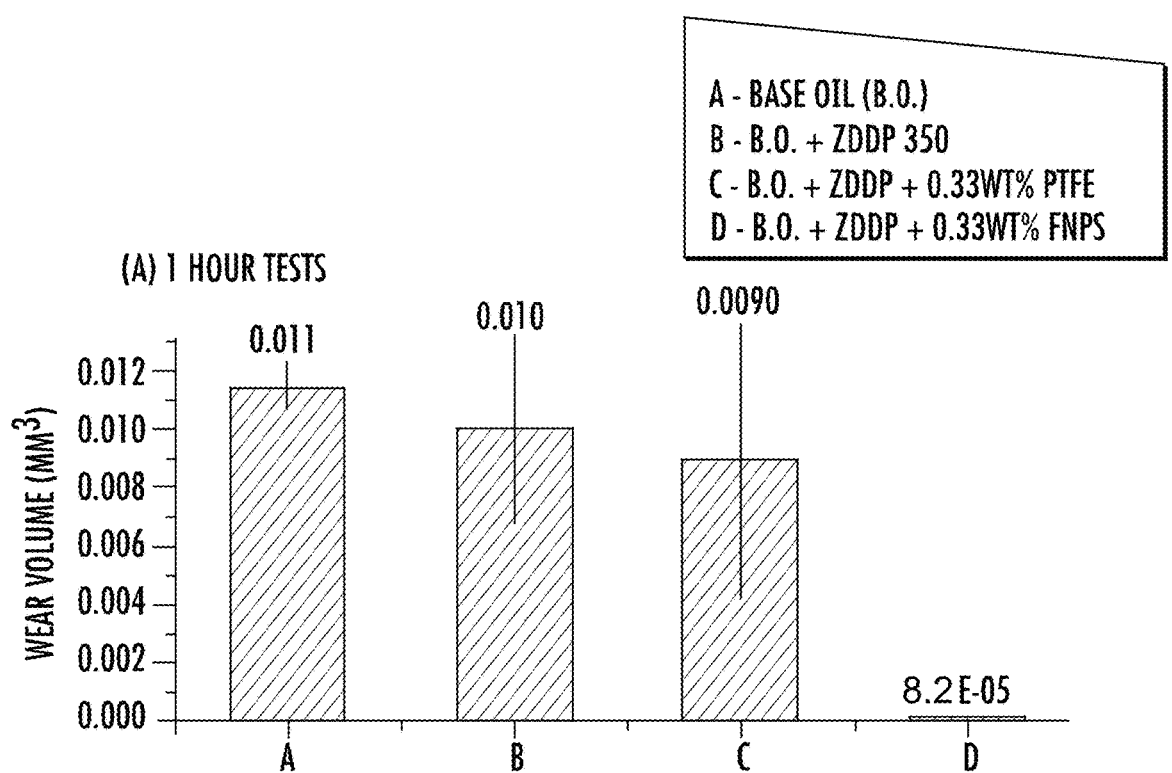
FIGS. 5A and 5B each illustrates wear data associated with metal parts lubricated with a lubricant composition according to some embodiments described herein.
Figure 5B:
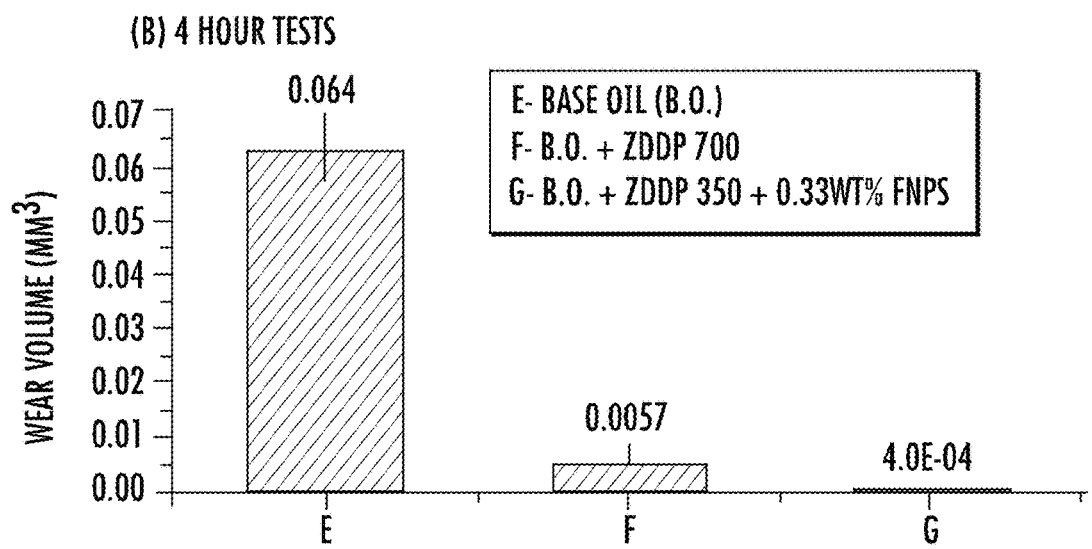

The wear volume was calculated by measuring the wear scar on the cylinder using an optical microscope. The wear results for oil formulations employing FNPs demonstrated a significant reduction in wear volume compared to the other samples, as shown in FIGS. 5A-B. As FIG. 5A illustrates, formulation D exhibited almost immeasurable wear as did formulation G in FIG. 5B. The presence of FNPs coated with siliceous chemistry enhanced the anti-wear properties of ZDDP even at reduced amount of phosphorus in the oil.

EXAMPLE 3

Tribochemical Evaluation of Lubricant Compositions

An extensive comparative study of the tribochemistry of the films was performed which includes specimens from one hour tests; formulation B (B.O.+ZDDP 350 ppm of phosphorus level) and formulation D (B.O.+ZDDP 350 ppm of phosphorous level+0.33 wt. % FNPs). X-ray photoelectron spectroscopy (XPS) was used for elemental analysis of the samples after tribological testing. The results obtained are shown in FIGS. 6A-H. Each of these figures provides a contrast between the sample which contained only the base oil and ZDDP (350 ppm phosphorous-level, i.e., no nanoparticle additive) and the sample containing the base oil with ZDDP (350 ppm phosphorous-level) and 0.33 wt. % FNPs, i.e., added plasma surface functionalized PTFE nanoparticles). As depicted earlier in the wear measurement results, a very dramatic difference is observed when comparing these samples.

Figure 6A:
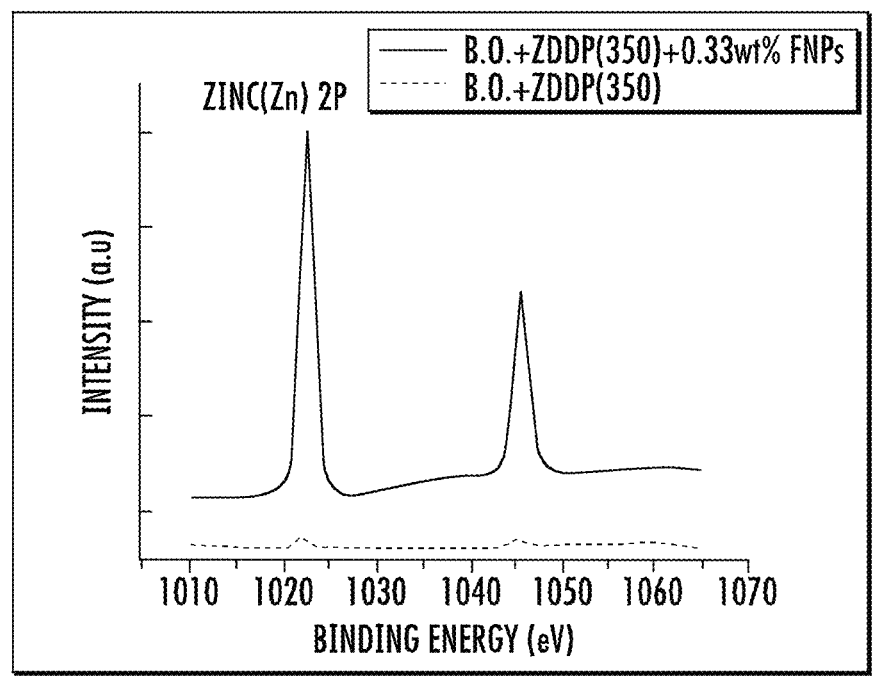
FIGS. 6A-H depict XPS spectra for surfaces treated with lubricant compositions according to some embodiments described herein.
Figure 6B:
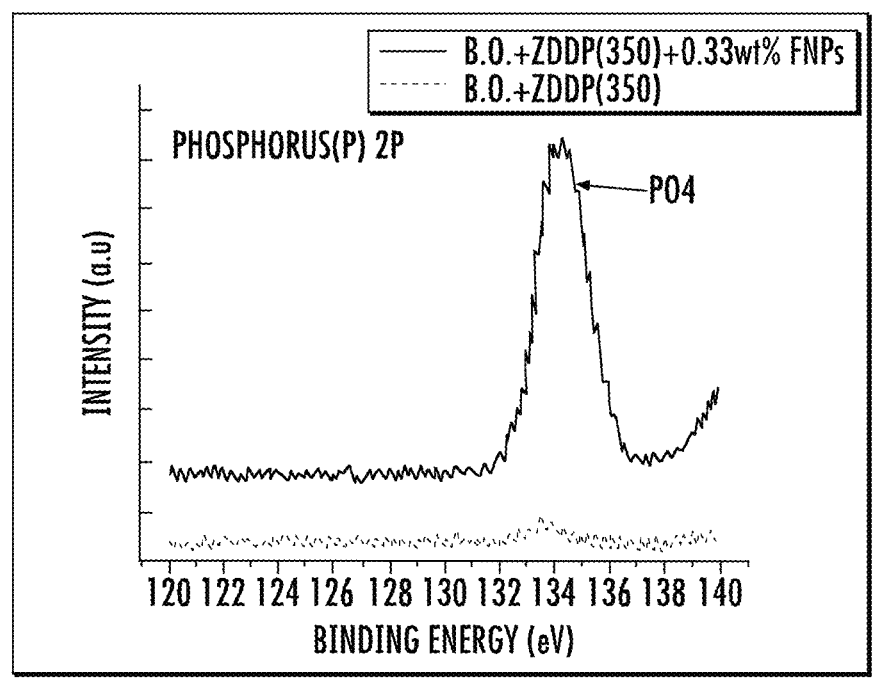
Figure 6C:
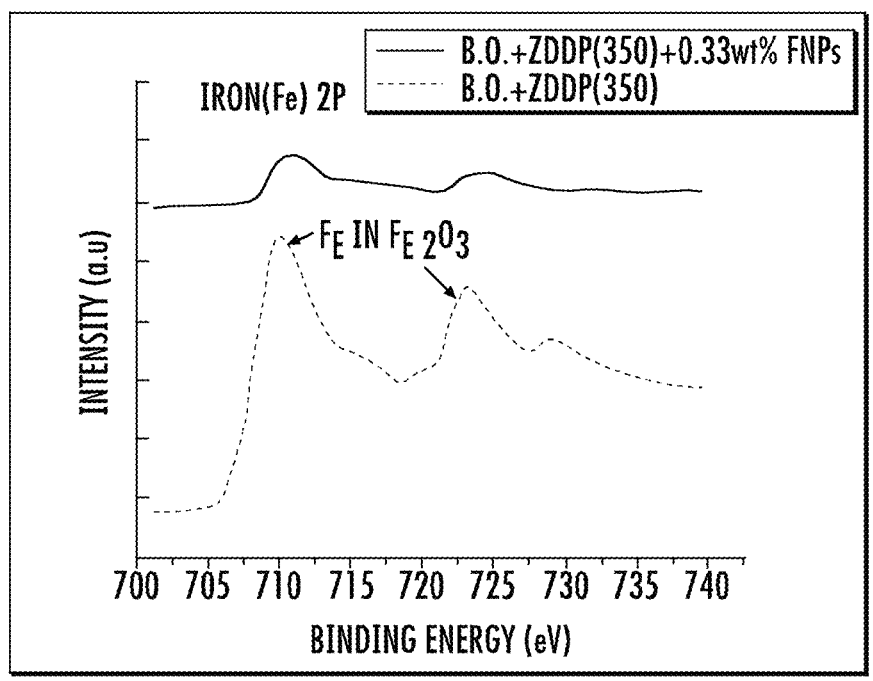
Figure 6D:
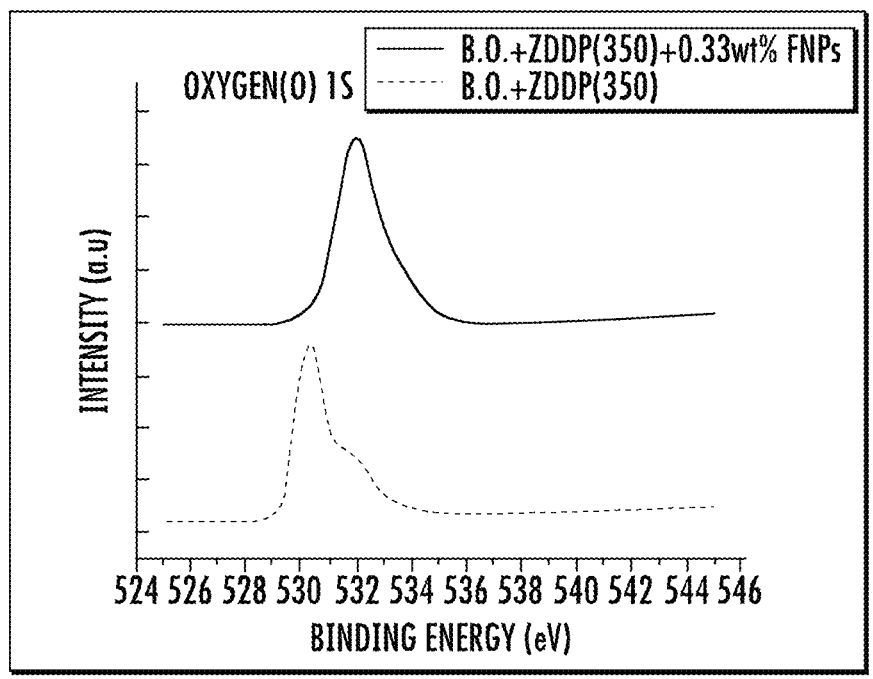
Figure 6E:
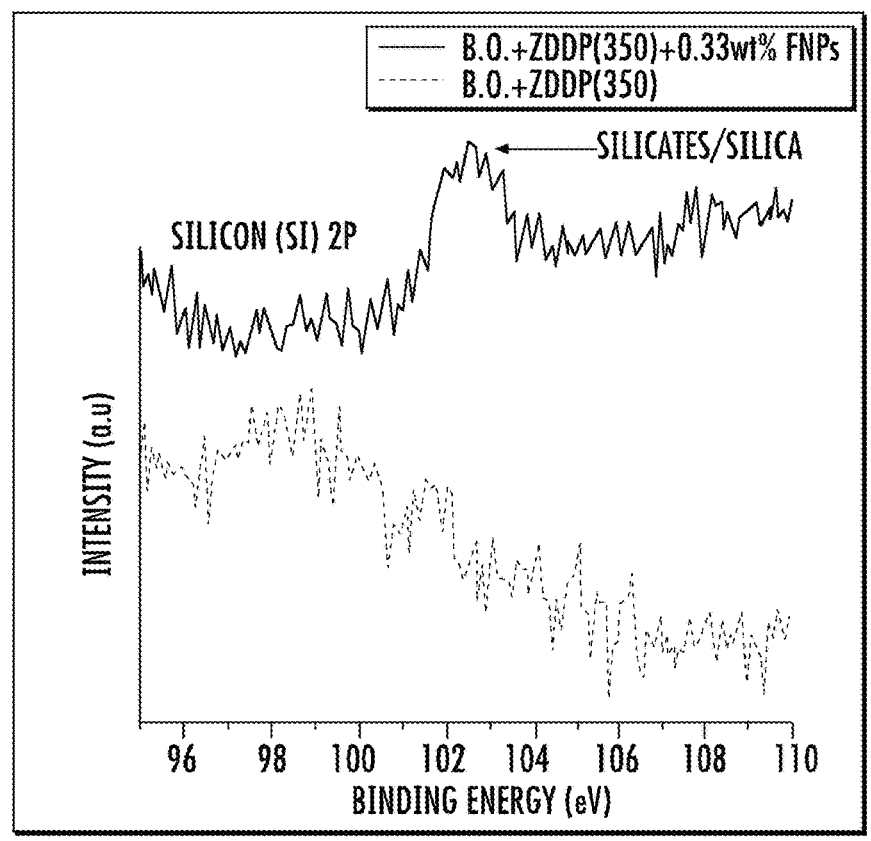
Figure 6F:
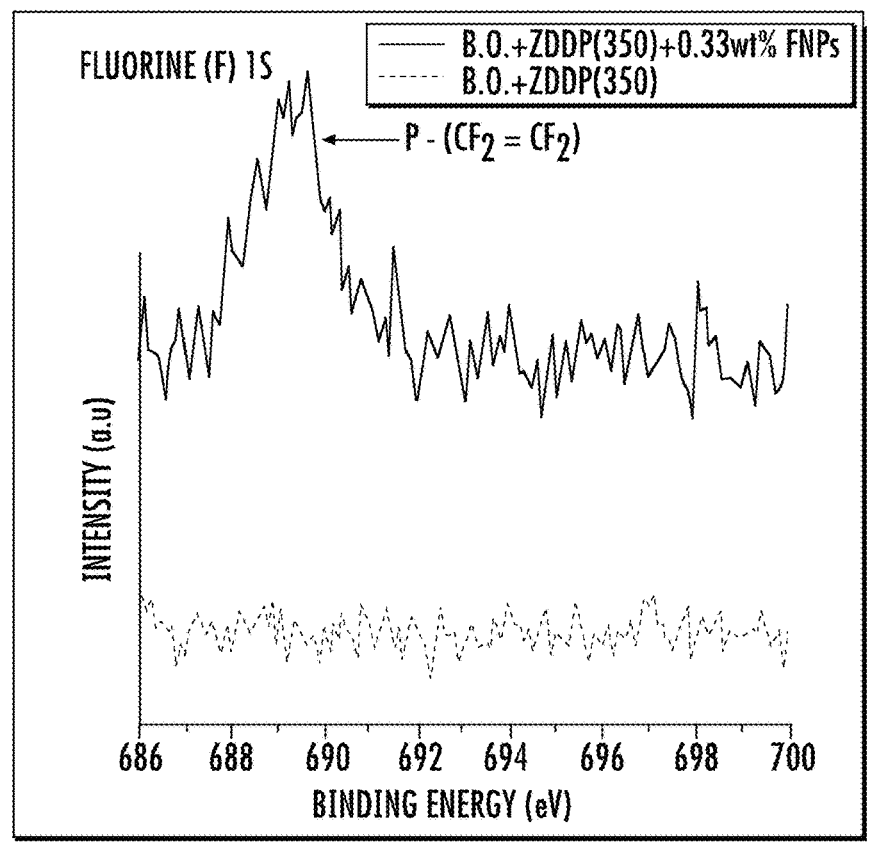
Figure 6G:
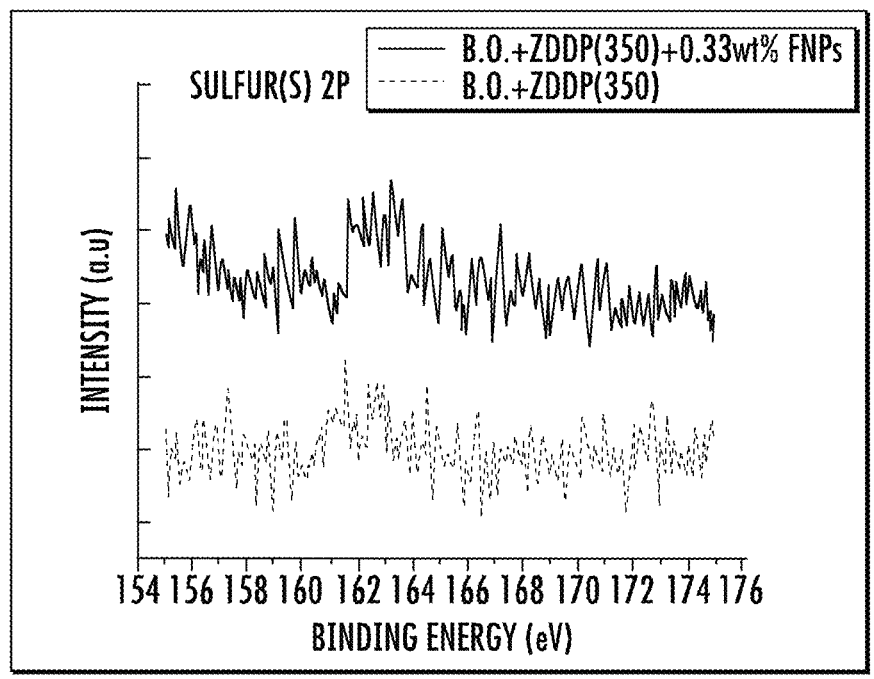
Figure 6H:
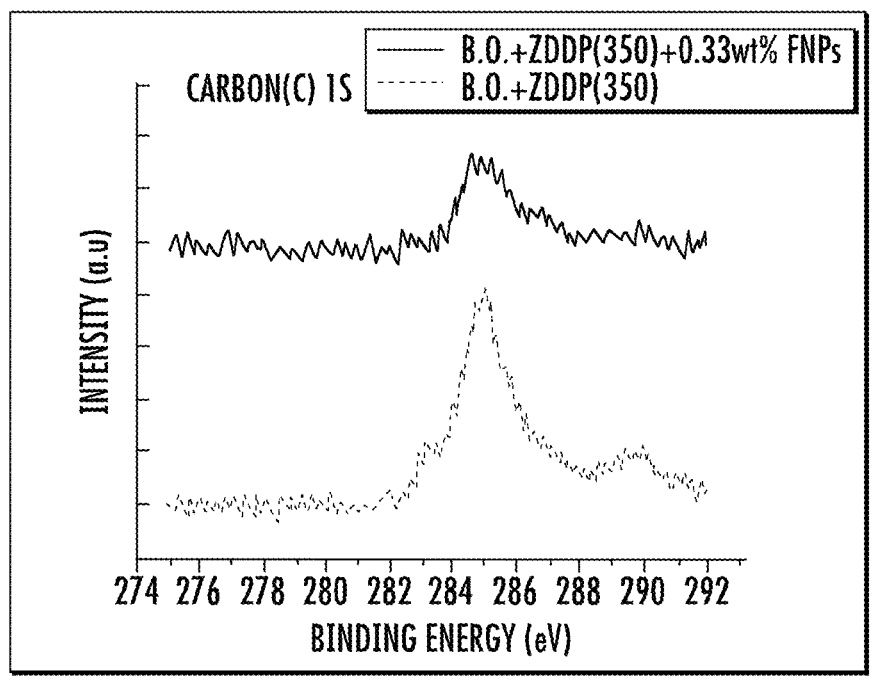

For example, for zinc 2p and phosphorus 2p in respective FIGS. 6A-B, sharp peaks (~1022.6 eV & ~1045.7 eV for Zn 2p; ~134.3 eV for P 2p) are visible in the sample of oil containing FNPs when compared to the sample consisting only of base oil and ZDDP (i.e., compared to the sample devoid of FNPs). The FNP formulation also exhibits very low intensity peaks for Fe 2p as compared to the other as seen in FIG. 6C. This clearly indicates the presence of stable tribofilms containing both zinc and phosphorus on the surface. Whereas the overall concentration of oxygen looks relatively similar in O 2p spectra for both samples in FIG. 6D, there is a distinct shift in peak shape, with an increased presence of higher binding energy electrons from the sample containing the functionalized nanoparticles. The peak for the sample without FNPs is at lower binding energy (~530.1 eV) and corresponds to oxides of iron whereas for the sample with FNPs there is a shift in the peak position towards higher binding energy values (~531.9 eV & ~533.8 eV). The phosphorus and silicon species bound to oxygen contribute to this peak shift and this again confirms the presence of phosphates protecting the surface and reducing the wear.

The peaks in FIGS. 6E-H illustrating the spectra for Si 2p (~103 eV) and F is (~689.4 eV) show the presence of siliceous (Si—O) and carbon bound fluorine chemical species in the tribofilm for sample with ZDDP and FNPs whereas the other sample fails to show any evidence for both the elements. These results indicate that FNPs were successfully able to deliver the siliceous chemistry to the interacting interfaces and contributed to the formation of protective films by acting in synergy with ZDDP in the oil.

Figure 7A:
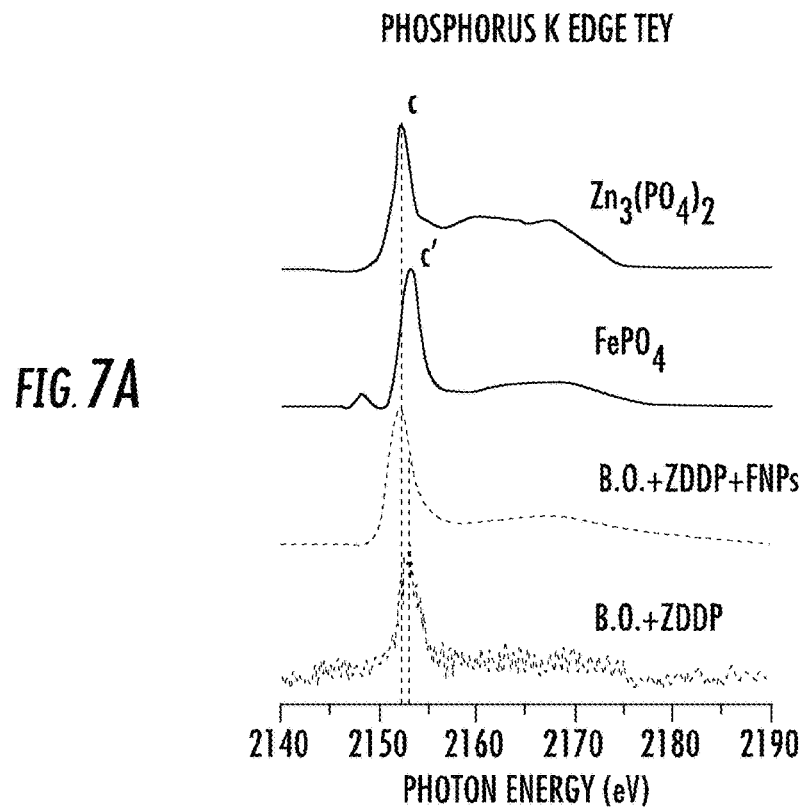
FIGS. 7A and 7B depict total electron yield (TEY) mode X-ray absorption near edge spectroscopy (XANES) phosphorus data for surfaces treated with lubricant compositions according to some embodiments described herein.
Figure 7B:
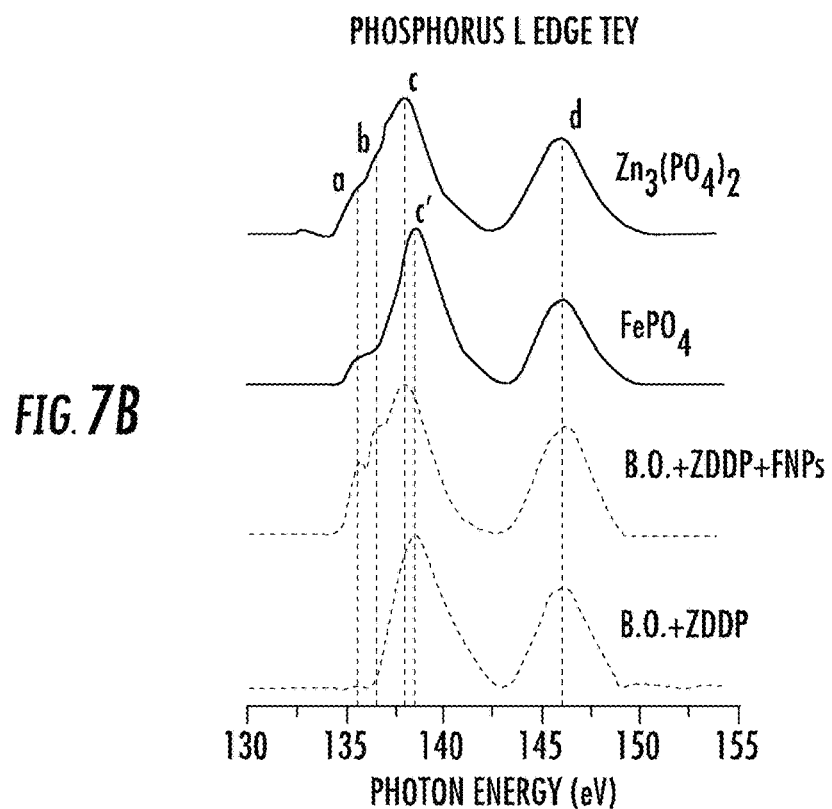

FIGS. 7A-B depict total electron yield (TEY) mode spectra for surfaces treated with lubricant oil compositions as described herein. The X-ray absorption near edge structure spectroscopy (XANES), is an analytical technique wherein absorption spectra involving core electron excitation to higher energy unoccupied states are obtained. It is used to determine the local coordination of the elements and the information can be obtained from both surface and bulk of the sample. XANES spectra provide detailed information concerning both the geometric make up and electronic structure of the absorbing atom. XANES analyses are broadly employed in investigating the chemical composition of the tribofilms formed from different oil additives.

In the present case, the XANES study focused on phosphorus and sulfur chemistry in the tribofilms. It included fluorescence yield (FLY) mode spectra, which gives information from bulk of the sample and total electron yield (TEY) mode spectra, which is more surface sensitive, for both K and L shell electrons. As shown in FIGS. 7A, 7B, 8A, and 8B, there are surprising differences observed in contrasting the phosphorus L and K edge spectra, and sulfur K edge spectra obtained from one hour test specimens with oils that contain Base Oil (B.O)+ZDDP (350 ppm of P level) and B.O.+ZDDP (350 ppm of P level)+0.33 wt % FNPs. For phosphorus K and L edge, the initial two spectra in each graph are those obtained for pure samples of zinc phosphate and iron (III) phosphate, obtained for both K (FIG. 7A) and L (FIG. 7B) level electrons. In each case there is a clear energy shift of the phosphorus fluorescence to higher value for the P atoms associated with Zn, compared to Fe. For sulfur K edge, there are two sets of spectra obtained from pure samples in FLY (FIG. 8A) and TEY (FIG. 8B) mode. The first set of spectra is from sulfide compounds namely zinc sulfide, iron sulfide and pyrite, and the second set is from sulfate species like zinc sulfate, ferrous sulfate and ferric sulfate.

Phosphorous K-edge TEY spectra for model compounds, shown in FIG. 7A have peaks c (2152.2 eV) and c' (2153.22), which correspond to the electronic transition from 1 s to a vacant p state. The energy for peak c (i.e., for zinc phosphate) is slightly lower than peak c' (i.e., for iron oxide). The peak position of the spectra from the specimen tested with ZDDP and functionalized nanoparticles (FNPs) overlaps exactly with that of zinc phosphate model compound. Whereas the specimen tested with only ZDDP has peak position overlapping with iron phosphate. Clearly, the K-edge spectra from the tested samples provide further confirmation that stable tribofilms of zinc phosphate are prominently present only on the surface of the sample which contained the added FNPs.

Phosphorous L-edge TEY XANES spectra provide additional chemical information as the sampling depth is around 5-15 nm. As shown in the figure the different peak positions for model compounds are marked as a, b, c, c' and d. Each peak has its own significance assigned to specific electronic transitions. Peak a is correlated with Zinc Phosphates's P 2p spin orbital splitting, whereas peaks assigned as c and c' correspond to transitions to the $t_2^*$ molecular orbital in zinc and iron phosphate respectively. Peak d, around 146.0 eV, is characteristic of various different types of phosphates present in both samples. Again, from the plots in FIG. 7B, it can be deduced that tribofilms generated on the specimen tested with oil containing plasma functionalized PTFE nanoparticles (i.e., FNPs) is primarily composed of zinc phosphate as all the peak positions (a, b & c) align with the peaks for zinc phosphate model compound.

The peaks for the other sample (ZDDP only) line up with those of the iron phosphate model compound, and are indicative of respective chemistry in the tribofilm. Phosphorus L-edge spectra is also very useful for the estimation of chain length of polyphosphates present in the tribofilm on the surface and for this purpose, the ratio of peak intensities of peak a and c is calculated. A peak height a/c ratio up to 0.3 to 0.4 corresponds to the presence of shot chain polyphosphates and a/c ratio above 0.6 represents long chain polyphosphates. The spectra for sample with FNPs as additive has a/c ratio of ~0.5, which indicates medium chain polyphosphates are present in the top 5-15 nm of the tribofilm. It is quite evident in the plots that tribofilms for the sample with FNPs has phosphorus mainly in the form of zinc phosphate (medium chain) whereas the other sample, i.e. the one without FNPs, has phosphorus present as iron phosphate.

Figure 8A:
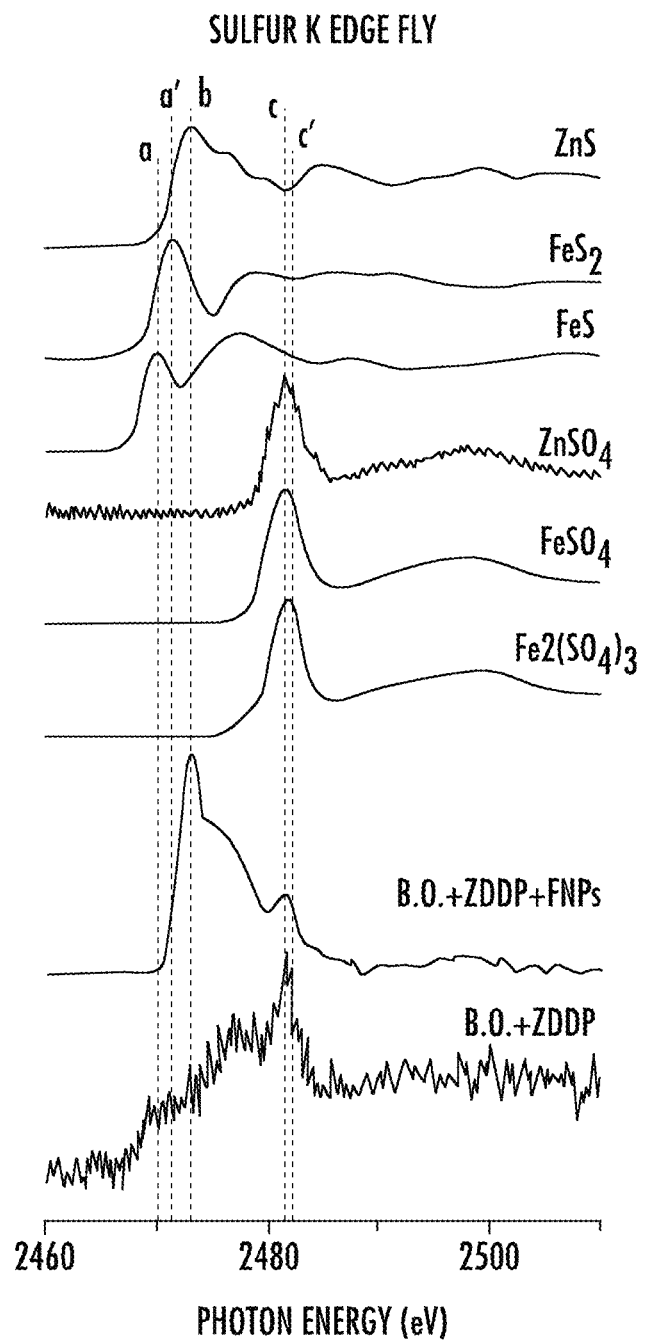
FIG. 8A is the sulfur K edge fluorescence yield (FLY) mode X-ray absorption near edge spectroscopy (XANES) spectra for model compounds in tribofilms by lubricant compositions according to some embodiments described herein.

The sulfur K edge spectra for model compounds are shown in both FLY (FIG. 8A) and TEY (FIG. 8B) mode. The peak position for each kind of sulfide compound is easily distinguishable from the other. The main peak positions for FeS (peak a), $FeS_2$ (peak a') and ZnS (peak b) are located at 2470 eV, 2471.5 eV and 2473 eV respectively. The peak positions of all the sulfates species are centered around 2481.5 eV (peak c & c'). FIG. 8A shows the sulfur K edge spectra in FLY mode, the peak positions for sample with ZDDP and functionalized nanoparticles (FNPs) align with that of ZnS and Zn/Fe sulfate model compounds. The difference in peak intensities suggests that the tribofilm is rich in zinc sulfide and sulfur in the form of sulfates is relatively low.

Figure 8B:
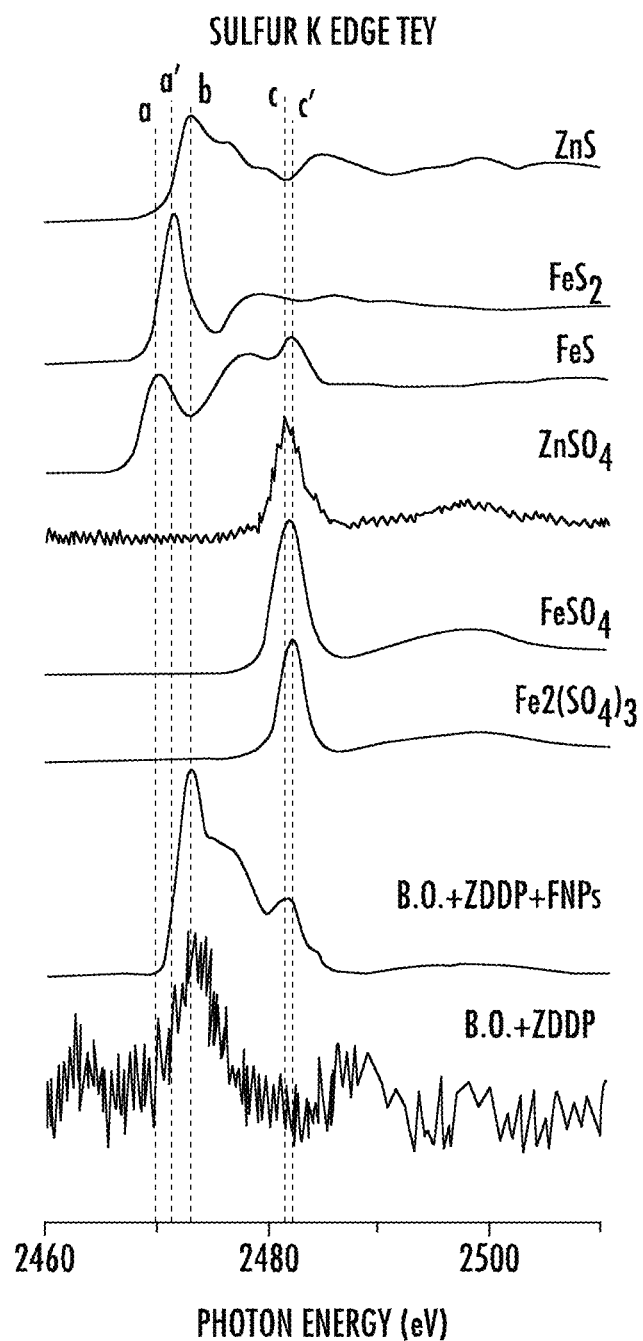
FIG. 8B is the sulfur K edge TEY mode XANES spectra for model compounds in tribofilms generated by lubricant compositions with and without functionalized nanoparticles (FNPs) according to some embodiments described herein.

Whereas, the sample without nanoparticles (ZDDP 350 only) shows only one prominent peak which overlaps with peak position of sulfates and the other peaks overlapping with Zn/Fe sulfides appear very noisy. This indicates, for this sample, that sulfur is present mostly in the form of sulfates and the amount of sulfides is very low in the tribofilm. The sulfur K edge TEY data is shown in FIG. 8B and the information regarding sulfur chemistry in the sample with functionalized nanoparticles is essentially the same as the FLY mode which indicates that sulfur is mainly present in the form of zinc sulfide in the tribofilm when ZDDP and FNPs is used and amount of sulfate is significantly lower than sulfides. In addition, the TEY mode plot for sample with only ZDDP has a peak overlapping with zinc sulfide's peak position and there is no peak for sulfates.

Overall, the sulfur K edge data from both FLY and TEY mode suggests that the sample with ZDDP and FNPs has a stable protective tribofilm which is rich in sulfur compared to the sample with only ZDDP where amount of sulfur is very low. In addition, the sulfur chemistry and its presence across the thickness of tribofilm is also very different in both the samples. Sample with nanoparticles has ample amount of zinc sulfide and zinc sulfate present in the film along with iron sulfide/sulfate. Whereas, the presence of sulfur for sample with only ZDDP is mainly in the form of iron bound sulfates and other species of sulfur such as zinc sulfide/sulfate, iron sulfide are present at a very low concentration and therefore they fail to provide with any friction and wear protection.

Figure 9:
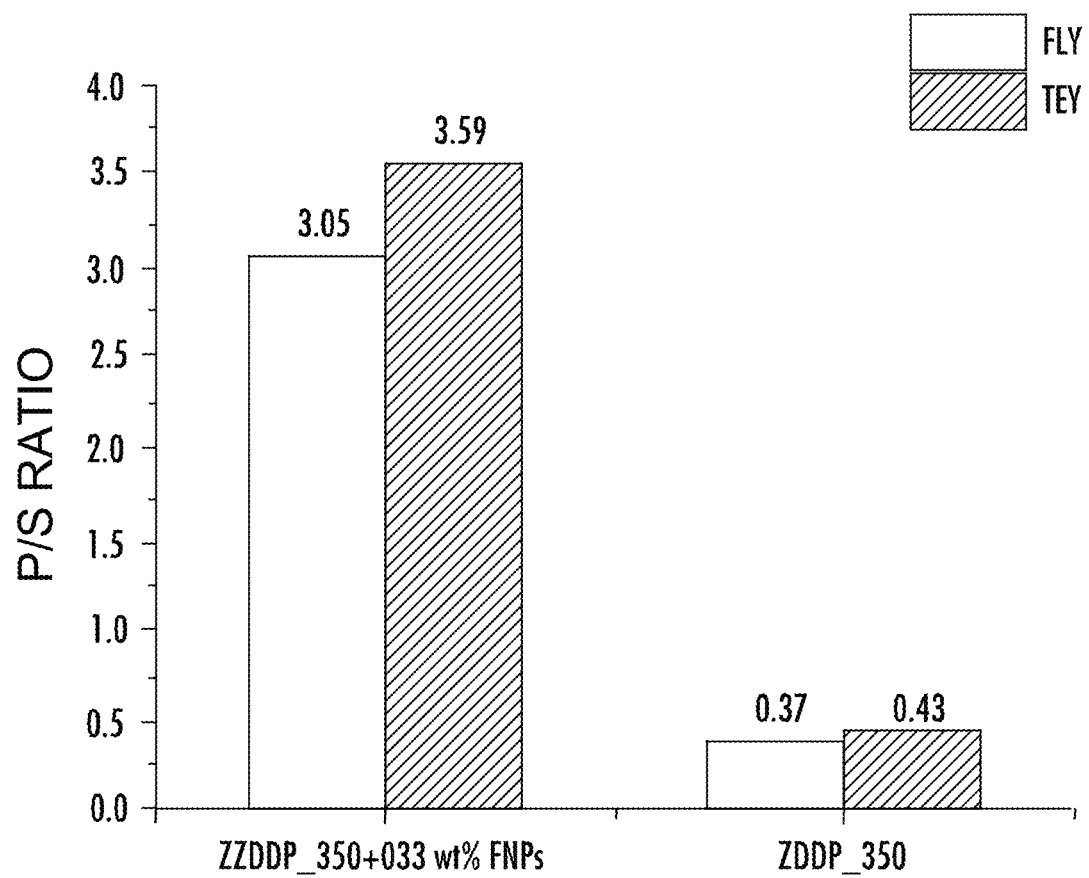
FIG. 9 depicts relative phosphorous/sulfur (P/S) ratios for tribofilms generated by lubricant compositions with and without FNPs according to some embodiments described herein.

Other information that can be deduced from the phosphorous and sulfur K edge spectra is the relative abundance in the tribofilm. FIG. 9 shows the phosphorous/sulfur (P/S) ratio for the two samples (i.e., one sample with FNPs and one without), calculated by the integrating the area under the peak for P and S in the spectra and taking their ratio. Sulfides and sulfates together contribute to the total amount of sulfur represented here. As depicted in FIG. 9, the amount of phosphorus in the tribofilm for the sample with ZDDP and FNPs is significantly higher than the sulfur species. The data from FLY and TEY mode for the oil with ZDDP+FNPs suggests that compared to the bulk (FLY data: P/S ratio: 3.05), the near surface region of the tribofilm has higher amount of phosphorus (FY Data: P/S ratio: 3.95), which is present mainly in the form of medium to long chain phosphates of zinc. But for sample with only ZDDP (i.e., without FNPs), the sulfur chemistry is clearly more abundant than phosphorus and its presence is almost similar in the bulk (FLY data: P/S ratio: 0.37) and near surface region (TEY data: P/S ratio: 0.43) of the film.

Figure 10A:
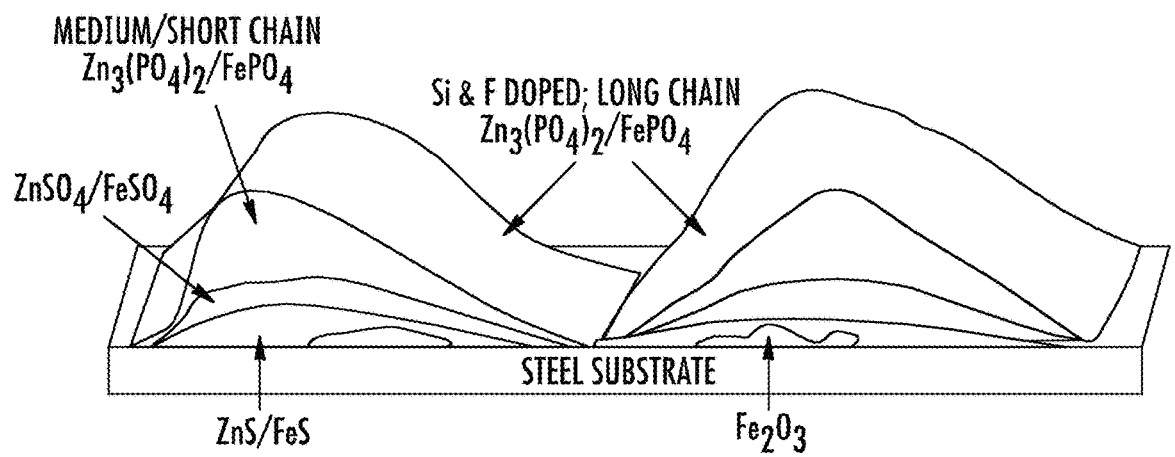
FIGS. 10A and 10B schematically illustrate phenomenological models for tribofilms generated by lubricant compositions with and without FNPs according to some embodiments described herein.
Figure 10B:
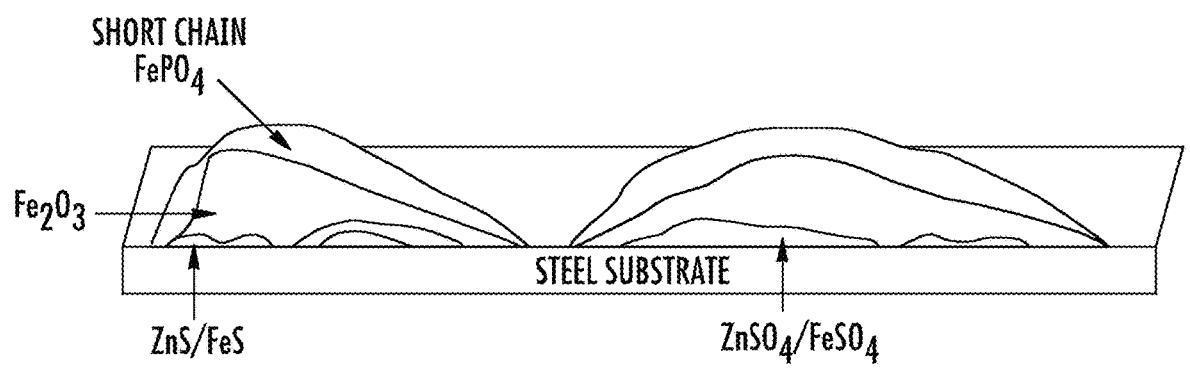

Further, all of the chemical information from the XPS and XANES analysis described above was taken into account to develop phenomenological models for tribofilms for samples; a) B.O+ZDDP (350)+0.33 wt % FNPs, as shown in FIG. 10A, and b) B.O+ZDDP 350, as shown in FIG. 10B. XPS analysis provided information regarding the presence of silicon and fluorine chemistry doped into amorphous zinc phosphate glassy films. In addition, the distinctive chemical make-up of the tribofilms for both the samples was evident from oxygen, zinc, phosphorus and iron XPS spectra. XANES characterization gave more insight into phosphorus and sulfur chemistry, their local chemical environment and relative amounts in the tribofilms.

As shown in the FIG. 10A, the tribofilm for sample with ZDDP and plasma FNPs has Si and F doped long chain Zn/Fe phosphates in the top region and underneath it has short/medium chain phosphates. The sulfides and sulfates of Zn/Fe are mostly present in the bulk of the film and close to the steel substrate. However, the tribofilm for sample with only ZDDP has iron oxide as one of the main constituent (FIG. 10B) and the contribution from phosphorus and sulfur chemistry is not very significant. The overall amount of sulfur species is higher than phosphorus and it is primarily present in the bulk of the film in the form of sulfate and sulfide of Zn/Fe. The phosphorus in the film is mostly iron phosphate. The synergistic interaction of ZDDP and PTFE nanoparticles coated with the siliceous chemistry contribute to the formation of phosphorus and sulfur rich protective tribofilm at the rubbing contacts. Whereas, ZDDP by itself at such low level of phosphorus fails to form any stable tribofilm at the surface to provide with anti-wear/anti-friction benefits. The presence of the stable tribofilms with phosphates of Zn and the presence of sulfides of Zn in the tribofilm formed with ZDDP+PHGM are contributing factors for the significantly improved wear and frictional performance even at 350 ppm of P in the oil.

The results clearly reveal that the addition of the plasma functionalized nanoparticles to the base oil provide a very significant improvement in reducing friction and wear, clearly outperforming samples having only ZDDP, or ZDDP plus un-functionalized particles. It is also shown that these functionalized particles provide improved tribological properties in base oils containing a two-fold reduction in ZDDP to that observed in samples devoid of these particles. The improved wear performance is attributed from the stable tribofilm formation with polyphosphates of Zn doped with Si and F when ZDDP is used in combination with functionalized nanoparticles of PTFE. On the other hand, oils with just ZDDP at 350 ppm resulted in primarily the formation of oxides of Fe with very small amounts of phosphates of Zn and largely sulfates of Zn and Fe, which are less protective. The improved wear performance coupled with the reduced concentration of ZDDP should help reduce automobile catalyst deactivation due to phosphate glass deposits and reduce overall greenhouse gas emissions. Reduced friction can translate into improved fuel efficiency of internal combustion engines.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A nanoparticle comprising:
   a core;
   a first shell disposed on the core; and
   a second shell disposed on the first shell,
   wherein the first shell is formed from a siliceous material; and
   wherein the second shell is formed from a hydrophobic material,
   wherein a degree of crosslinking and/or a molecular weight of the siliceous material of the first shell varies in a radial direction of the nanoparticle.

2. The nanoparticle of claim 1, wherein the first shell is conformally coated onto the core and the second shell is conformally coated onto the first shell.

3. The nanoparticle of claim 1, wherein the core is formed from a shearable material.

4. The nanoparticle of claim 1, wherein the core is formed from a fluorinated organic polymer.

5. The nanoparticle of claim 4, wherein the core is formed from polytetrafluoroethylene (PTFE).

6. The nanoparticle of claim 5, wherein the PTFE is carboxylated.

7. The nanoparticle of claim 1, wherein the core has a length of 10-500 nm in three dimensions.

8. The nanoparticle of claim 1, wherein the first shell comprises a plurality of layers differing in chemical composition.

9. The nanoparticle of claim 1, wherein the first shell has an average thickness of 1-20 nm.

10. The nanoparticle of claim 1, wherein the second shell has an average thickness of 1-20 nm.

11. The nanoparticle of claim 1, wherein the hydrophobic material of the second shell is an organic polymer.

12. The nanoparticle of claim 11, wherein the organic polymer comprises a poly(meth)acrylate, a polyketone, a polyaldehyde, a polyvinyl, a polyalkylene, or a mixture thereof.

13. The nanoparticle of claim 1, wherein the second shell includes one or more hydrophobic pendant groups that radially extend from a surface of the second shell.

14. A lubricant composition comprising:
    a base oil; and
    a plurality of nanoparticles of claim 1 dispersed in the base oil.

15. The lubricant composition of claim 14 further comprising a phosphorus-containing additive dispersed in the base oil.

16. The lubricant composition of claim 15, wherein:
    the base oil comprises a Group I, Group II, Group III, or Group IV base oil;
    the core of the nanoparticles is formed from polytetrafluoroethylene (PTFE);
    the first shell of the nanoparticles is conformally coated onto the core of the nanoparticles;
    the second shell of the nanoparticles is conformally coated onto the first shell of the nanoparticles;
    the second shell is formed from a poly(meth)acrylate;
    the phosphorus-containing additive comprises zinc dialkyldithiophosphate (ZDDP);
    the nanoparticles are present in the composition in an amount of 0.10-3.0 wt. %, based on the total weight of the composition; and
    the phosphorus-containing additive is present in the composition in an amount of 0.01-0.04 wt. %, based on the total weight of the composition.

17. A method of making nanoparticles, the method comprising:
    providing a plurality of cores;
    forming a first shell on the cores, the first shell comprising a siliceous material; and
    forming a second shell on the first shell, the second shell comprising a hydrophobic material,
    wherein a degree of crosslinking and/or a molecular weight of the siliceous material of the first shell varies in a radial direction of the nanoparticle.

18. The method of claim 17, wherein forming the first shell on the cores is carried out by plasma polymerization and forming the second shell on the first shell is carried out by plasma polymerization.

19. The method of claim 18, wherein the first shell is conformally coated onto the cores and the second shell is conformally coated onto the first shell.

* * * * *